(12) United States Patent
Seldess

(10) Patent No.: US 11,032,644 B2
(45) Date of Patent: Jun. 8, 2021

(54) SUBBAND SPATIAL AND CROSSTALK PROCESSING USING SPECTRALLY ORTHOGONAL AUDIO COMPONENTS

(71) Applicant: Boomcloud 360, Inc., Encinitas, CA (US)

(72) Inventor: Zachary Seldess, San Diego, CA (US)

(73) Assignee: Boomcloud 360, Inc., Encinitas, CA (US)

( * ) Notice: Subject to any disclaimer, the term of this patent is extended or adjusted under 35 U.S.C. 154(b) by 0 days.

(21) Appl. No.: 16/983,827

(22) Filed: Aug. 3, 2020

(65) Prior Publication Data

US 2021/0112340 A1 Apr. 15, 2021

Related U.S. Application Data

(60) Provisional application No. 62/939,364, filed on Nov. 22, 2019, provisional application No. 62/913,661, filed on Oct. 10, 2019.

(51) Int. Cl.
| | |
|---|---|
| *H04R 3/04* | (2006.01) |
| *H04R 3/14* | (2006.01) |
| *H04S 7/00* | (2006.01) |
| *H04R 5/04* | (2006.01) |

(52) U.S. Cl.
CPC ............... *H04R 3/14* (2013.01); *H04R 3/04* (2013.01); *H04R 5/04* (2013.01); *H04S 7/307* (2013.01); *H04S 2400/01* (2013.01)

(58) Field of Classification Search
None
See application file for complete search history.

(56) References Cited

U.S. PATENT DOCUMENTS

| | | |
|---|---|---|
| 2008/0245215 A1 | 10/2008 | Kobayashi |
| 2012/0140598 A1 | 6/2012 | Wakabayashi |
| 2014/0270281 A1 | 9/2014 | Walsh et al. |

(Continued)

FOREIGN PATENT DOCUMENTS

| | | | |
|---|---|---|---|
| WO | WO 2015/062649 A1 | 5/2015 | |
| WO | WO 2018/211167 A1 | 11/2018 | |

OTHER PUBLICATIONS

PCT International Search Report and Written Opinion, PCT Application No. PCT/US2020/045669, dated Nov. 13, 2020, 12 pages.

(Continued)

*Primary Examiner* — James K Mooney
(74) *Attorney, Agent, or Firm* — Fenwick & West LLP

(57) ABSTRACT

A system processes an audio signal using spectrally orthogonal sound components. The system includes a circuitry that generates a mid component and a side component from a left channel and a right channel of the audio signal. The circuitry generates a hyper mid component including spectral energy of the side component removed from spectral energy of the mid component, and generate a residual mid component including spectral energy of the hyper mid component removed from the spectral energy of the mid component. The circuitry filters subbands of the residual mid component, such as to apply a subband spatial processing. The circuitry generates a left output channel and a right output channel using the filtered subbands of the residual mid component.

39 Claims, 22 Drawing Sheets

(56) References Cited

U.S. PATENT DOCUMENTS

2018/0310110 A1 10/2018 Wu et al.
2019/0191247 A1* 6/2019 Seldess .................. H04S 7/302
2020/0037056 A1* 1/2020 Clark ...................... H04W 4/80

OTHER PUBLICATIONS

PCT International Search Report and Written Opinion, PCT Application No. PCT/US2020/045670, dated Nov. 13, 2020, nine pages.

* cited by examiner

SUBBAND SPATIAL AND CROSSTALK PROCESSING USING SPECTRALLY ORTHOGONAL AUDIO COMPONENTS

CROSS REFERENCE TO RELATED APPLICATIONS

This application claims the benefit of U.S. Provisional Application No. 62/913,661, filed Oct. 10, 2019, and U.S. Provisional Application No. 62/939,364, filed Nov. 22, 2019, each incorporated by reference in its entirety.

TECHNICAL FIELD

The disclosure generally relates to audio processing, and more specifically to spatial audio processing.

BACKGROUND

Conceptually, the side (or "spatial") component of a left-right stereo signal can be thought of as the portion of the left and right channels that includes spatial information (i.e. sounds in a stereo signal appearing anywhere left or right of center in the soundstage). Conversely, the mid (or "non-spatial") component of a left-right stereo signal can be thought of as the portion of the left and right channels that includes non-spatial information (i.e., sounds in a stereo signal appearing in the center of the soundstage). While the mid component contains the energy in the stereo signal that is perceived as non-spatial, it also commonly has energy from elements in the stereo signal that are not perceptually located in the center of the soundstage. Similarly, while the side component contains the energy in the stereo signal that is perceived as spatial, it also commonly has energy from elements in the stereo signal that are perceptually located in the center of the soundstage. To enhance the range of possibilities in processing audio, it is desirable to isolate and operate on the portion of the mid and side components that are spectrally "orthogonal" to one another.

SUMMARY

Embodiments relate to spatial audio processing using spectrally orthogonal audio components, such as the hyper mid, hyper side, residual mid, or residual side components of a stereo audio signal or other multi-channel audio signal. The spatial audio processing may include a subband spatial processing that enhances spatial detectability or a crosstalk compensation processing that compensates for spectral defects caused by crosstalk processing applied to the audio signal. The crosstalk processing may include crosstalk cancellation or crosstalk simulation.

Some embodiments include a system for processing an audio signal. The system includes a circuitry that generates a mid component and a side component from a left channel and a right channel of the audio signal. The circuitry generates a hyper mid component including spectral energy of the side component removed from spectral energy of the mid component, and generate a residual mid component including spectral energy of the hyper mid component removed from the spectral energy of the mid component. The circuitry filters subbands of the residual mid component, such as to apply a subband spatial processing. The circuitry generates a left output channel and a right output channel using the filtered subbands of the residual mid component.

In some embodiments, each of the subbands of the residual mid component includes a set of critical bands.

In some embodiments, the circuitry generates a hyper side component including the spectral energy of the mid component removed from the spectral energy of the side component, generates a residual side component including the spectral energy of the hyper side component removed from the spectral energy of the side component, filters subbands of the residual side component, and generates the left and right output channels using the filtered subbands of the residual side component.

In some embodiments, the circuitry generates a hyper side component including the spectral energy of the mid component removed from the spectral energy of the side component, filters subbands of the hyper side component, and generates the left and right output channels using the filtered subbands of the hyper side component.

In some embodiments, the circuitry filters subbands of the side component and generates the left and right output channels using the filtered subbands of the side component.

In some embodiments, the circuitry filters subbands of the hyper mid component and generates the left and right output channels using the filtered subbands of the hyper mid component.

In some embodiments, the circuitry applies a crosstalk processing to the audio signal. The crosstalk processing includes a crosstalk cancellation or a crosstalk simulation. In some embodiments, the circuitry filters the hyper mid component to compensate for spectral defects caused by the crosstalk processing. In some embodiments, the circuitry filters the residual mid component to compensate for spectral defects caused by the crosstalk processing. In some embodiments, the circuitry filters the mid component to compensate for spectral defects caused by the crosstalk processing. In some embodiments, the circuitry generates a hyper side component including the spectral energy of the mid component removed from the spectral energy of the side component, and filters the hyper side component to compensate for spectral defects caused by the crosstalk processing. In some embodiments, the circuitry generates a residual side component including the spectral energy of the hyper side component removed from the spectral energy of the side component, and filters the residual side component to compensate for spectral defects caused by the crosstalk processing. In some embodiments, the circuitry filters the side component to compensate for spectral defects caused by the crosstalk processing.

Some embodiments include a non-transitory computer readable medium including stored program code. The program code when executed by at least one processor configures the at least one processor to generate a mid component and a side component from a left channel and a right channel of an audio signal, generate a hyper mid component including spectral energy of the side component removed from spectral energy of the mid component, generate a residual mid component including spectral energy of the hyper mid component removed from the spectral energy of the mid component, filter subbands of the residual mid component, and generate a left output channel and a right output channel using the filtered subbands of residual mid component.

Some embodiments include a method performed by a circuitry. The method includes generating a mid component and a side component from a left channel and a right channel of an audio signal, generating a hyper mid component including spectral energy of the side component removed from spectral energy of the mid component, generating a residual mid component including spectral energy of the hyper mid component removed from the spectral energy of the mid component, filtering subbands of the residual mid component, and generating a left output channel and a right output channel using the filtered subbands of residual mid component.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

DETAILED DESCRIPTION

Figure 1:
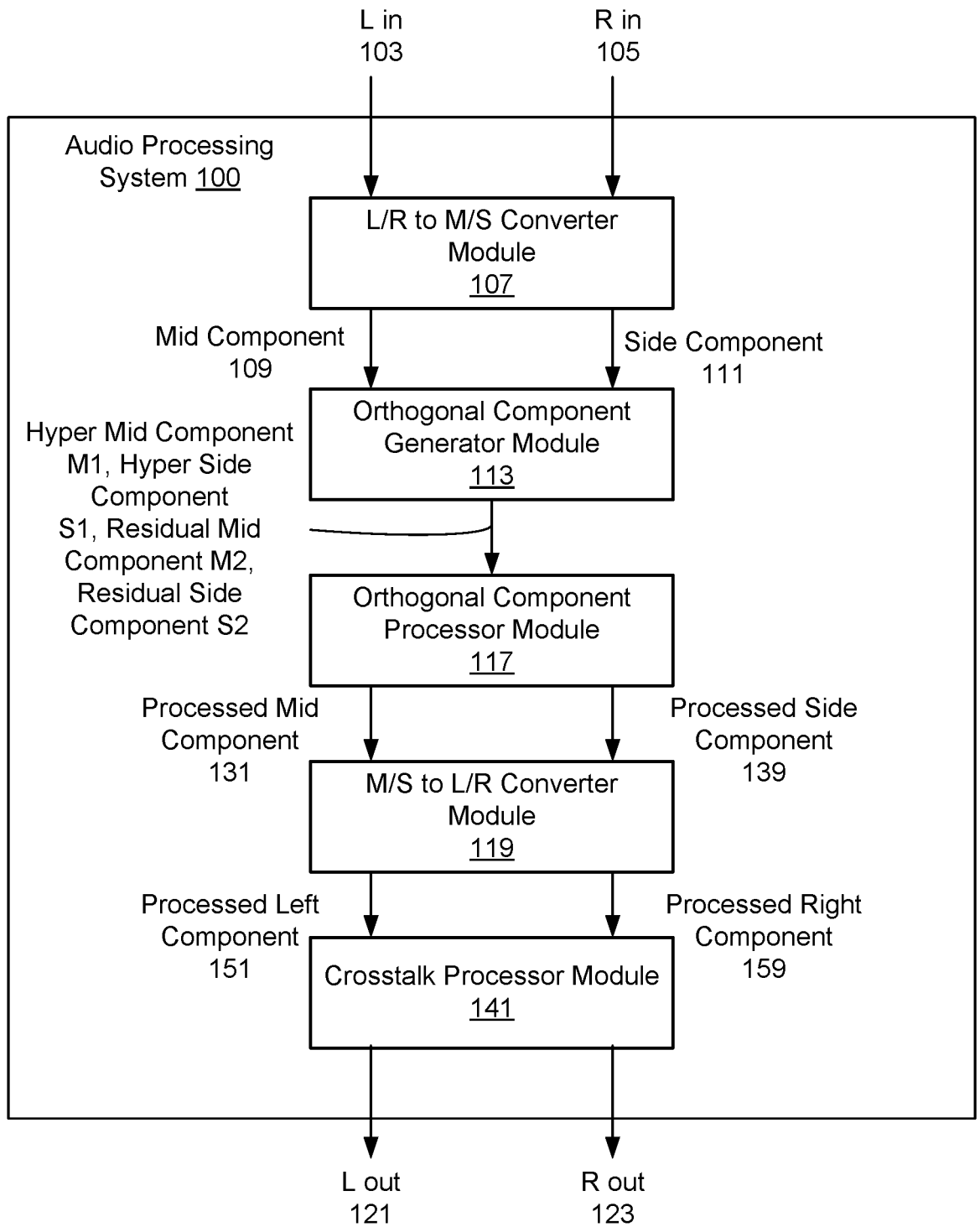
FIG. 1 is a block diagram of an audio processing system, in accordance with one or more embodiments.

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Embodiments relate to spatial audio processing using mid and side components that are spectrally orthogonal to one another. For example, an audio processing system generates a hyper mid component that isolates portions of the mid component corresponding only to spectral energy present at the center of the sound stage, or a hyper side component that isolates portions of the side component corresponding only to spectral energy not present at the center of the sound stage. The hyper mid component includes spectral energy of the side component removed from spectral energy of the mid component, and the hyper side component includes the spectral energy of the mid component removed from the spectral energy of the side component. The audio processing system may also generate a residual mid component corresponding to spectral energy of the mid component with the hyper mid component removed (e.g., by subtracting spectral energy of the hyper mid component from spectral energy of the mid component), or a residual side component corresponding to spectral energy of the side component with the hyper side component removed (e.g., by subtracting spectral energy of the hyper side component from spectral energy of the side component). By isolating these orthogonal components and performing various types of audio processing using these components, the audio processing system is able to provide targeted enhancement of audio content. The hyper mid component represents the non-spatial (i.e., mid) spectral energy at the center of soundstage. For example, the non-spatial spectral energy at the center of the sound stage may include dialog of a movie or primary vocal content in music. Applying signal processing operations on the hyper mid enables the adjustment of such audio content without changing spectral energy present elsewhere in the soundstage. For example, in some embodiments, vocal content may be partly and/or completely removed by applying a filter to the hyper mid component that decreases spectral energy in the typical human vocal range. In other embodiments, targeted vocal enhancements or effects to vocal content may be applied by filters that increase energy in the typical human vocal range (e.g., via compression, reverb, and/or other audio processing techniques). The residual mid component represents non-spatial spectral energy that is not at the very center of the soundstage. Applying signal processing techniques on the residual mid allows similar transformations to occur orthogonally from other components. For example, in some embodiments, to provide a spatial widening effect on audio content with minimal change in overall perceived gain and minimal loss of vocal presence, targeted spectral energy in the residual mid component may be partially and/or entirely removed, while spectral energy in the residual side component is increased.

Example Audio Processing System

FIG. 1 is a block diagram of an audio processing system 100, in accordance with one or more embodiments. The audio processing system 100 is a circuitry that processes an input audio signal to generate a spatially enhanced output audio signal. The input audio signal includes a left input channel 103 and a right input channel 105, and the output audio signal includes a left output channel 121 and a right output channel 123. The audio processing system 100 includes an L/R to M/S converter module 107, an orthogonal component generator module 113, an orthogonal component processor module 117, an M/S to L/R converter module 119, and a crosstalk processor module 141. In some embodiments, the audio processing system 100 includes a subset of the components mentioned above and/or additional components to those mentioned above. In some embodiments, the audio processing system 100 processes the input audio signal in an order different from that shown in FIG. 1. For example, the audio processing system 100 may process the input audio with crosstalk processing prior to processing using the orthogonal component generator module 113 and orthogonal component processor module 117.

The L/R to M/S converter module 107 receives the left input channel 103 and the right input channel 105 and generates a mid component 109 (e.g., a non-spatial component) and a side component 111 (e.g., spatial component) from the input channels 103 and 105. In some embodiments, the mid component 109 is generated based on a sum of the left input channel 103 and the right input channel 105, and the side component 111 is generated based on a difference between the left input channel 103 and the right input channel 105. In some embodiments, several mid and side components are generated from a multichannel input audio signal (e.g., surround sound). Other L/R to M/S types of transformations may be used to generate the mid component 109 and the side component 111.

The orthogonal component generator module 113 processes the mid component 109 and the side component 111 to generate at least one of: a hyper mid component M1, a hyper side component S1, a residual mid component M2, and a residual side component S2. The hyper mid component M1 is the mid component 109 with the side component 111 removed. The hyper side component S1 is the spectral energy of the side component 111 with the spectral energy of the mid component 109 removed. The residual mid component M2 is the spectral energy of the mid component 109 with the spectral energy of the hyper mid component M1 removed. The residual side component S2 is the spectral energy of the side component 111 with the spectral energy of the hyper side component S1 removed. In some embodiments, the audio processing system 100 generates the left output channel 121 and the right output channel 123 by processing at least one of the hyper mid component M1, the hyper side component S1, the residual mid component M2, and the residual side component S2. The orthogonal component generator module 113 is further described with respect to FIGS. 2A-C.

The orthogonal component processor module 117 processes one or more of the hyper mid component M1, the hyper side component S1, the residual mid component M2, and/or the residual side component S2. The processing on the components M1, M2, S1, and S2 may include various types of filtering such as spatial cue processing (e.g., amplitude or delay-based panning, binaural processing, etc.), dynamic range processing, machine-learning based processing, gain application, reverberation, adding audio effects, or other types of processing. In some embodiments, the orthogonal component processor module 117 performs subband spatial processing and/or crosstalk compensation processing using the hyper mid component M1, the hyper side component S1, the residual mid component M2, and/or the residual side component S2 to generate a processed mid component 131 and a processed side component 139. Subband spatial processing is processing performed on frequency subbands of mid and side components of an audio signal to spatially enhanced the audio signal. Crosstalk compensation processing is processing performed on an audio signal that adjusts for spectral artifacts caused by crosstalk processing, such as crosstalk compensation for loudspeakers or crosstalk simulation for headphones. The orthogonal component processor module 117 is further described with respect to FIG. 3.

The M/S to L/R converter module 119 receives the processed mid component 131 and the processed side component 139 and generates a processed left component 151 and a processed right component 159. In some embodiments, the processed left component 151 is generated based on a sum of the processed mid component 131 and the processed side component 139 and the processed right component 159 is generated based on a difference between the processed mid component 131 and the processed side component 139. Other M/S to L/R types of transformations may be used to generate the processed left component 151 and the processed right component 159.

The crosstalk processor module 141 receives and performs crosstalk processing on the processed left component 151 and the processed right component 159. Crosstalk processing includes, for example, crosstalk simulation or crosstalk cancellation. Crosstalk simulation is processing performed on an audio signal (e.g., output via headphones) to simulate the effect of loudspeakers. Crosstalk cancellation is processing performed on an audio signal, configured to be output via loudspeakers, to remove crosstalk caused by loudspeakers. The crosstalk processor module 141 outputs the left output channel 121 and the right output channel 123.

Example Orthogonal Component Generator

Figure 2A:
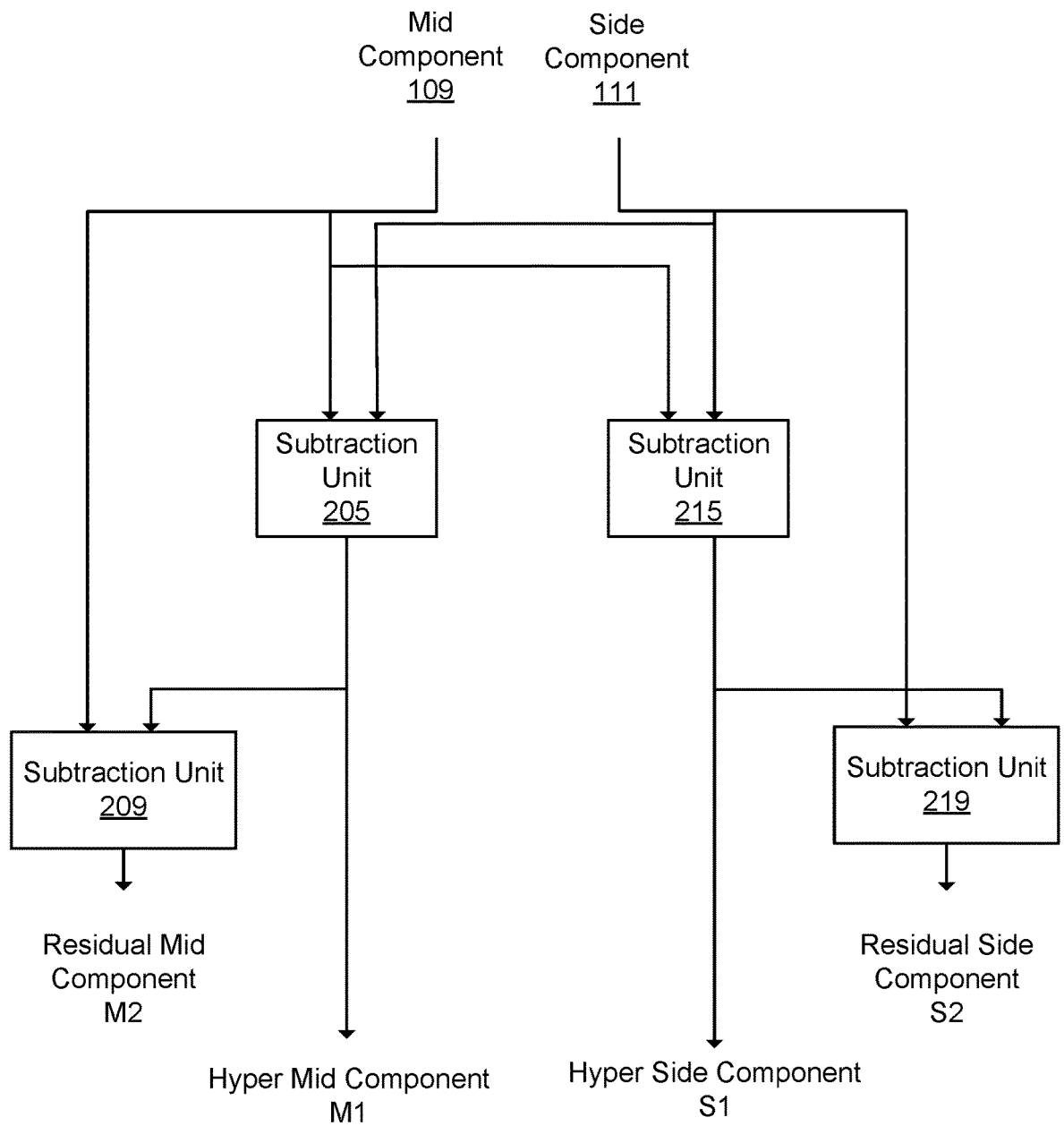
FIG. 2A is a block diagram of an orthogonal component generator, in accordance with one or more embodiments.
Figure 2B:
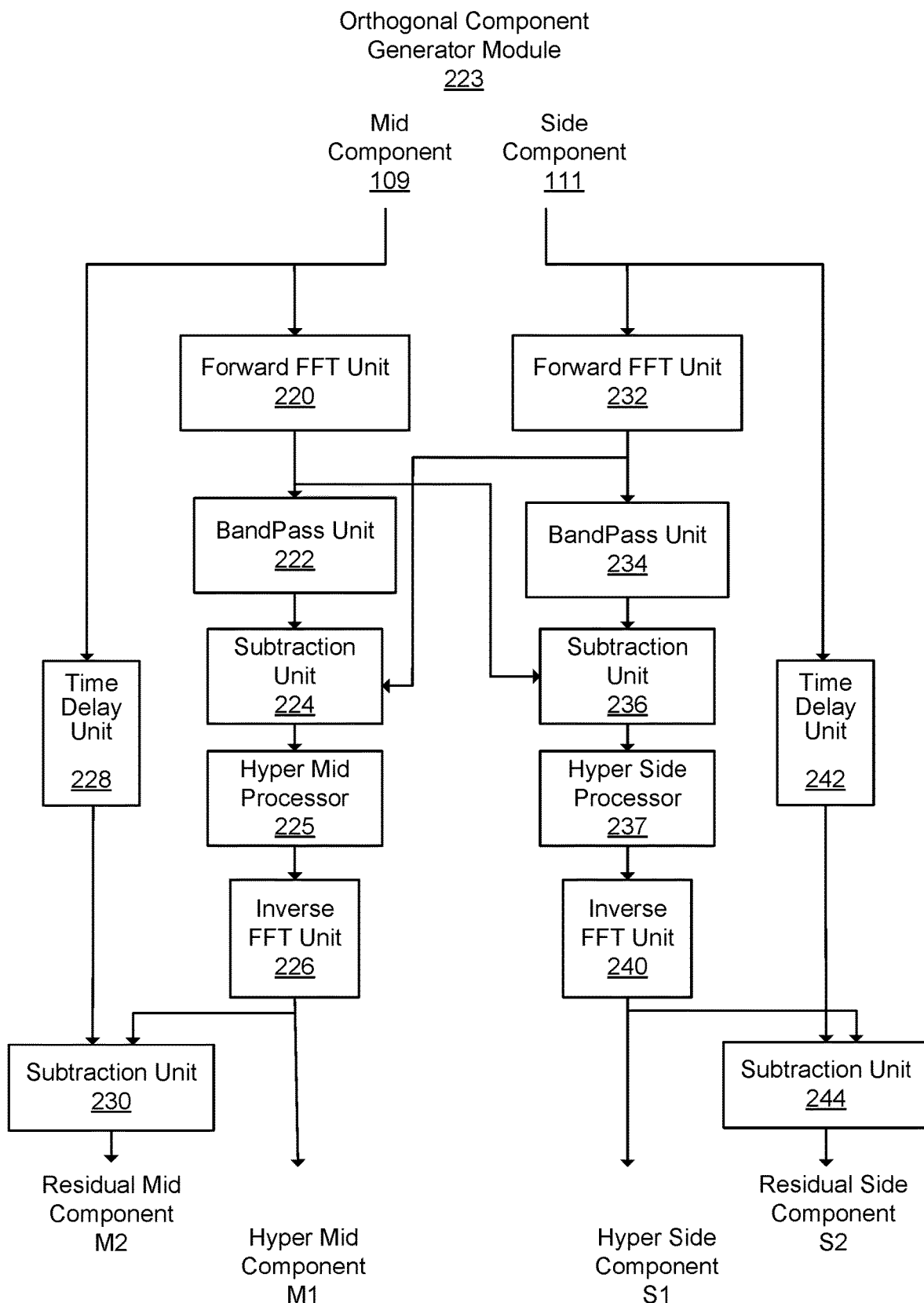
FIG. 2B is a block diagram of an orthogonal component generator, in accordance with one or more embodiments.
Figure 2C:
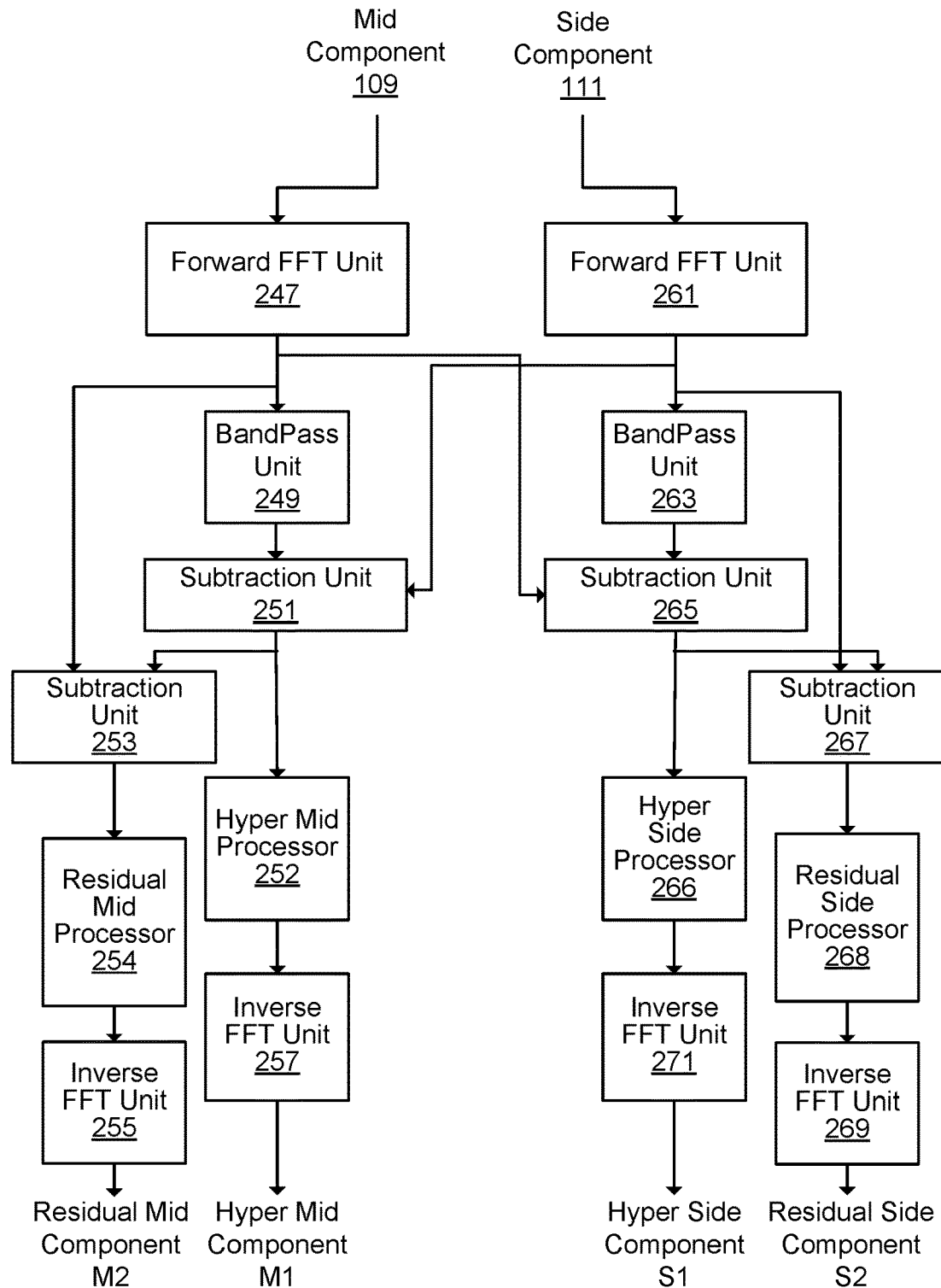
FIG. 2C is a block diagram of an orthogonal component generator, in accordance with one or more embodiments.

FIGS. 2A-C are block diagrams of orthogonal component generator modules 213, 223, and 245, respectively, in accordance with one or more embodiments. The orthogonal component generator modules 213, 223, and 245 are examples of the orthogonal component generator module 113.

With reference to FIG. 2A, the orthogonal component generator module 213 includes a subtraction unit 205, a subtraction unit 209, a subtraction unit 215, and a subtraction unit 219. As described above, the orthogonal component generator module 113 receives the mid component 109 and the side component 111, and outputs one or more of the hyper mid component M1, the hyper side component S1, the residual mid component M2, and the residual side component S2.

The subtraction unit 205 removes spectral energy of the side component 111 from spectral energy of the mid component 109 to generate the hyper mid component M1. For example, the subtraction unit 205 subtracts a magnitude of the side component 111 in the frequency domain from a magnitude of the mid component 109 in the frequency domain, while leaving phase alone, to generate the hyper mid component M1. Subtraction in the frequency domain may be performed using a Fourier transformation on the time domain signal to generate signals in the frequency domain, and then subtraction of the signals in the frequency domain. In other examples, the subtraction in the frequency domain could be performed in other ways, such as using a wavelet transform instead of a Fourier transform. The subtraction unit 209 generates a residual mid component M2 by removing spectral energy of the hyper mid component M1 from the spectral energy of the mid component 109. For example, the subtraction unit 209 subtracts a magnitude of the hyper mid component M1 in the frequency domain from a magnitude of the mid component 109 in the frequency domain, while leaving phase alone, to generate the residual mid component M2. Whereas subtracting the side from the mid in the time domain results in the original right channel of the signal, the above operations in the frequency domain isolates and differentiates between a portion of the spectral energy of the mid component that is different from the spectral energy of the side component (referred to as M1, or hyper mid), and a portion of the spectral energy of the mid component that is the same as the spectral energy of the side component (referred to as M2, or residual mid).

In some embodiments, additional processing may be used when subtraction of the spectral energy of the side component 111 from spectral energy of the mid component 109 results in a negative value for the hyper mid component M1 (e.g., for one or more of the bins in the frequency domain). In some embodiments, the hyper mid component M1 is clamped at a 0 value when the subtraction of the spectral energy of the side component 111 from the spectral energy of the mid component 109 results in a negative value. In some embodiments, the hyper mid component M1 is wrapped around by taking the absolute value of the negative value as the value of the hyper mid component M1. Other types of processing may be used when the subtraction of the spectral energy of the side component 111 from the spectral energy of the mid component 109 results in a negative value for M1. Similar additional processing may be used when the subtractions that generate the hyper side component S1, residual side component S2, or residual mid component M2 results in a negative, such as clamping at 0, wrap around, or other processing. Clamping the hyper mid component M1 at 0 will guarantee spectral orthogonality between M1 and both side components when the subtraction results in a negative value. Likewise, clamping the hyper side component S1 at 0 will guarantee spectral orthogonality between S1 and both mid components when the subtraction results in a negative value. By creating orthogonality between the hyper mid and side components and their appropriate mid/side counterpart components (i.e. side component for hyper mid, mid component for hyper side), the derived residual mid M2 and residual side S2 components contain spectral energy that is not orthogonal to (i.e. in common with) their appropriate mid/side counterpart components. That is, when applying clamping at 0 for the hyper mid, and using that M1 component to derive the residual mid, a hyper mid component that has no spectral energy in common with the side components and a residual mid component that has spectral energy that is fully in common with the side components is generated. The same relationships apply to hyper side and residual side when clamping the hyper side to 0. When applying frequency domain processing there is typically a tradeoff in resolution between frequency and timing information. As the frequency resolution increases (i.e. as the FFT window size, and number of frequency bins, grows), the time resolution decreases, and vice versa. The above-described spectral subtraction occurs on a per-frequency-bin basis, and it may therefore be preferable in certain situations, such as when removing vocal energy from the hyper mid component, to have a large FFT window size (e.g. 8192 samples, resulting in 4096 frequency bins given a real-valued input signal). Other situations may require more time resolution and therefore lower overall latency and lower frequency resolution (e.g. 512 sample FFT window size, resulting in 256 frequency bins given a real-valued input signal). In the latter case, the low frequency resolution of the mid and side, when subtracted from each other to derive the hyper mid M1 and hyper side S1 components, may produce audible spectral artifacts because of the spectral energy of each frequency bin being an average representation of energy over too large a frequency range. In this case, taking the absolute value of the difference between mid and side when deriving the hyper mid M1 or hyper side S1 can help mitigate perceptual artifacts by allowing per-frequency-bin divergence from true orthogonality in components. In addition to or in place of wrapping around 0, we may apply a coefficient to the subtrahend value, scaling that value between 0 and 1, and therefore providing a method for interpolation between at one extreme (i.e. with a value of 1), full orthogonality of hyper and residual mid/side components, and at the other extreme (i.e. with a value of 0), a hyper mid M1 and hyper side S1 that are identical to their corresponding original mid and side components.

The subtraction unit 215 removes the spectral energy of the mid component 109 in the frequency domain from the spectral energy of the side component 111 in the frequency domain, while leaving phase alone, to generate the hyper side component S1. For example, the subtraction unit 215 subtracts a magnitude of the mid component 109 in the frequency domain from a magnitude of the side component 111 in the frequency domain, while leaving phase alone, to generate the hyper side component S1. The subtraction unit 219 removes spectral energy of the hyper side component S1 from the spectral energy of the side component 111 to generate a residual side component S2. For example, the subtraction unit 219 subtracts a magnitude of the hyper side component S1 in the frequency domain from a magnitude of the side component 111 in the frequency domain, while leaving phase alone, to generate the residual side component S2.

In FIG. 2B, the orthogonal component generator module 223 is similar to the orthogonal component generator module 213 in that it receives the mid component 109 and the side component 111 and generates the hyper mid component M1, the residual mid component M2, the hyper side component S1, and the residual side component S2. The orthogonal component generator module 223 differs from the orthogonal generator module 213 by generating the hyper mid component M1 and hyper side component S1 in the frequency domain and then converting these components back to the time domain to generate the residual mid component M2 and residual side component S2. The orthogonal component generator module 223 includes a forward FFT unit 220, a bandpass unit 222, a subtraction unit 224, a hyper mid processor 225, an inverse FFT unit 226, a time delay unit 228, a subtraction unit 230, a forward FFT unit 232, a bandpass unit 234, a subtraction unit 236, a hyper side processor 237, an inverse FFT unit 240, a time delay unit 242, and a subtraction unit 244.

The forward fast Fourier transform (FFT) unit 220 applies a forward FFT to the mid component 109, converting the mid component 109 to a frequency domain. The converted mid component 109 in the frequency domain includes a magnitude and a phase. The bandpass unit 222 applies a bandpass filter to the frequency domain mid component 109, where the bandpass filter designates the frequencies in the hyper mid component M1. For example, to isolate a typical human vocal range, the bandpass filter may designate frequencies between 300 and 8000 Hz. In another example, to remove audio content associated with a typical human vocal range, the bandpass filter may keep lower frequencies (e.g., generated by a bass guitar or drums) and higher frequencies (e.g., generated by cymbals) in the hyper mid component M1. In other embodiments, the orthogonal component generator module 223 applies various other filters to the frequency domain mid component 109, in addition to and/or in place of the bandpass filter applied by the bandpass unit 222. In some embodiments, the orthogonal component generator module 223 does not include the bandpass unit 222 and does not apply any filters to the frequency domain mid component 109. In the frequency domain, the subtraction unit 224 subtracts the side component 111 from the filtered mid component to generate the hyper mid component M1. In other embodiments, in addition to and/or in lieu of later processing applied to the hyper mid component M1 as performed by an orthogonal component processor module (e.g., the orthogonal component processor module of FIG. 3), the orthogonal component generator module 223 applies various audio enhancements to the frequency domain hyper mid component M1. The hyper mid processor 225 performs processing on the hyper mid component M1 in the frequency domain prior to its conversion to the time domain. The processing may include subband spatial processing and/or crosstalk compensation processing. In some embodiments, the hyper mid processor 225 performs processing on the hyper mid component M1 instead of and/or in addition to processing that may be performed by the orthogonal component processor module 117. The inverse FFT unit 226 applies an inverse FFT to the hyper mid component M1, converting the hyper mid component M1 back to the time domain. The hyper mid component M1 in the frequency domain includes a magnitude of M1 and the phase of the mid component 109, which the inverse FFT unit 226 converts to the time domain. The time delay unit 228 applies a time delay to the mid component 109, such that the mid component 109 and the hyper mid component M1 arrive at the subtraction unit 230 at the same time. The subtraction unit 230 subtracts the hyper mid component M1 in the time domain from the time delayed mid component 109 in the time domain, generating the residual mid component M2. In this example, the spectral energy of the hyper mid component M1 is removed from the spectral energy of the mid component 109 using processing in the time domain.

The forward FFT unit 232 applies a forward FFT to the side component 111, converting the side component 111 to the frequency domain. The converted side component 111 in the frequency domain includes a magnitude and a phase. The bandpass unit 234 applies a bandpass filter to the frequency domain side component 111. The bandpass filter designates the frequencies in the hyper side component S1. In other embodiments, the orthogonal component generator module 223 applies various other filters to the frequency domain side component 111, in addition to and/or in place of the bandpass filter. In the frequency domain, the subtraction unit 236 subtracts the mid component 109 from the filtered side component 111 to generate the hyper side component S1. In other embodiments, in addition to and/or in lieu of later processing applied to the hyper side component S1 as performed by an orthogonal component processor (e.g., the orthogonal component processor module of FIG. 3), the orthogonal component generator module 223 applies various audio enhancements to the frequency domain hyper side component S1. The hyper side processor 237 performs processing on the hyper side component S1 in the frequency domain prior to its conversion to the time domain. The processing may include subband spatial processing and/or crosstalk compensation processing. In some embodiments, the hyper side processor 237 performs processing on the hyper side component S1 instead of and/or in addition to processing that may be performed by the orthogonal component processor module 117. The inverse FFT unit 240 applies an inverse FFT to the hyper side component S1 in the frequency domain, generating the hyper side component S1 in the time domain. The hyper side component S1 in the frequency domain includes a magnitude of S1 and the phase of the side component 111, which the inverse FFT unit 226 converts to the time domain. The time delay unit 242 time delays the side component 111 such that the side component 111 arrives at the subtraction unit 244 at the same time as the hyper side component S1. The subtraction unit 244 subsequently subtracts the hyper side component S1 in the time domain from the time delayed side component 111 in the time domain, generating the residual side component S2. In this example, the spectral energy of the hyper side component S1 is removed from the spectral energy of the side component 111 using processing in the time domain.

In some embodiments, the hyper mid processor 225 and hyper side processor 237 may be omitted if the processing performed by these components is performed by the orthogonal component processor module 117.

In FIG. 2C, the orthogonal component generator module 245 is similar to the orthogonal component generators module 223 in that it receives the mid component 109 and the side component 111 and generates the hyper mid component M1, the residual mid component M2, the hyper side component S1, and the residual side component S2, except that the orthogonal component generator module 245 generates each of the components M1, M2, S1, and S2 in the frequency domain and then converts these components to the time domain. The orthogonal component generator module 245 includes a forward FFT unit 247, a bandpass unit 249, a subtraction unit 251, a hyper mid processor 252, a subtraction unit 253, a residual mid processor 254, an inverse FFT unit 255, an inverse FFT unit 257, a forward FFT unit 261, a bandpass unit 263, a subtraction unit 265, a hyper side processor 266, a subtraction unit 267, a residual side processor 268, an inverse FFT unit 269, and an inverse FFT unit 271.

The forward FFT unit 247 applies a forward FFT to the mid component 109, converting the mid component 109 to the frequency domain. The converted mid component 109 in the frequency domain includes a magnitude and a phase. The forward FFT unit 261 applies a forward FFT to the side component 111, converting the side component 111 to the frequency domain. The converted side component 111 in the frequency domain includes a magnitude and a phase. The bandpass unit 249 applies a bandpass filter to the frequency domain mid component 109, the bandpass filter designating the frequencies of the hyper mid component M1. In some embodiments, the orthogonal component generator module 245 applies various other filters to the frequency domain mid component 109, in addition to and/or instead of the bandpass filter. The subtraction unit 251 subtracts the frequency domain side component 111 from the frequency domain mid component 109, generating the hyper mid component M1 in the frequency domain. The hyper mid processor 252 performs processing on the hyper mid component M1 in the frequency domain, prior to its conversion to the time domain. In some embodiments, the hyper mid processor 252 performs subband spatial processing and/or crosstalk compensation processing. In some embodiments, the hyper mid processor 252 performs processing on the hyper mid component M1 instead of and/or in addition to processing that may be performed by the orthogonal component processor module 117. The inverse FFT unit 257 applies an inverse FFT to the hyper mid component M1, converting it back to the time domain. The hyper mid component M1 in the frequency domain includes a magnitude of M1 and the phase of the mid component 109, which the inverse FFT unit 257 converts to the time domain. The subtraction unit 253 subtracts, in the frequency domain, the hyper mid component M1 from the mid component 109 to generate the residual mid component M2. The residual mid processor 254 performs processing on the residual mid component M2 in the frequency domain, prior to its conversion to the time domain. In some embodiments, the residual mid processor 254 performs subband spatial processing and/or crosstalk compensation processing on the residual mid component M2. In some embodiments, the residual mid processor 254 performs processing on the residual mid component M2 instead of and/or in addition to processing that may be performed by the orthogonal component processor module 117. The inverse FFT unit 255 applies an inverse FFT to convert the residual mid component M2 to the time domain. The residual mid component M2 in the frequency domain includes a magnitude of M2 and the phase of the mid component 109, which the inverse FFT unit 255 converts to the time domain.

The bandpass unit 263 applies a bandpass filter to the frequency domain side component 111. The bandpass filter designates frequencies in the hyper side component S1. In other embodiments, the orthogonal component generator module 245 applies various other filters to the frequency domain side component 111, in addition to and/or in place of the bandpass filter. In the frequency domain, the subtraction unit 265 subtracts the mid component 109 from the filtered side component 111 to generate the hyper side component S1. The hyper side processor 266 performs processing on the hyper side component S1 in the frequency domain, prior to its conversion to the time domain. In some embodiments, the hyper side processor 266 performs subband spatial processing and/or crosstalk compensation processing on the hyper side component S1. In some embodiments, the hyper side processor 266 performs processing on the hyper side component S1 instead of and/or in addition to processing that may be performed by the orthogonal component processor module 117. The inverse FFT unit 271 applies an inverse FFT to convert the hyper side component S1 back to the time domain. The hyper side component S1 in the frequency domain includes a magnitude of S1 and the phase of the side component 111, which the inverse FFT unit 271 converts to the time domain. The subtraction unit 267 subtracts, in the frequency domain, the hyper side component S1 from the side component 111, generating the residual side component S2. The residual side processor 268 performs processing on the residual side component S2 in the frequency domain, prior to its conversion to the time domain. In some embodiments, the residual side processor 268 performs subband spatial processing and/or crosstalk compensation processing on the residual side component S2. In some embodiments, the residual side processor 268 performs processing on the residual side component S2 instead of and/or in addition to processing that may be performed by the orthogonal component processor module 117. The inverse FFT unit 269 applies an inverse FFT to the residual side component S2, converting it to the time domain. The residual side component S2 in the frequency domain includes a magnitude of S2 and the phase of the side component 111, which the inverse FFT unit 269 converts to the time domain.

In some embodiments, the hyper mid processor 252, hyper side processor 266, residual mid processor 254, or residual side processor 268 may be omitted if the processing performed by these components is performed by the orthogonal component processor module 117.

Example Orthogonal Component Processor

Figure 3:
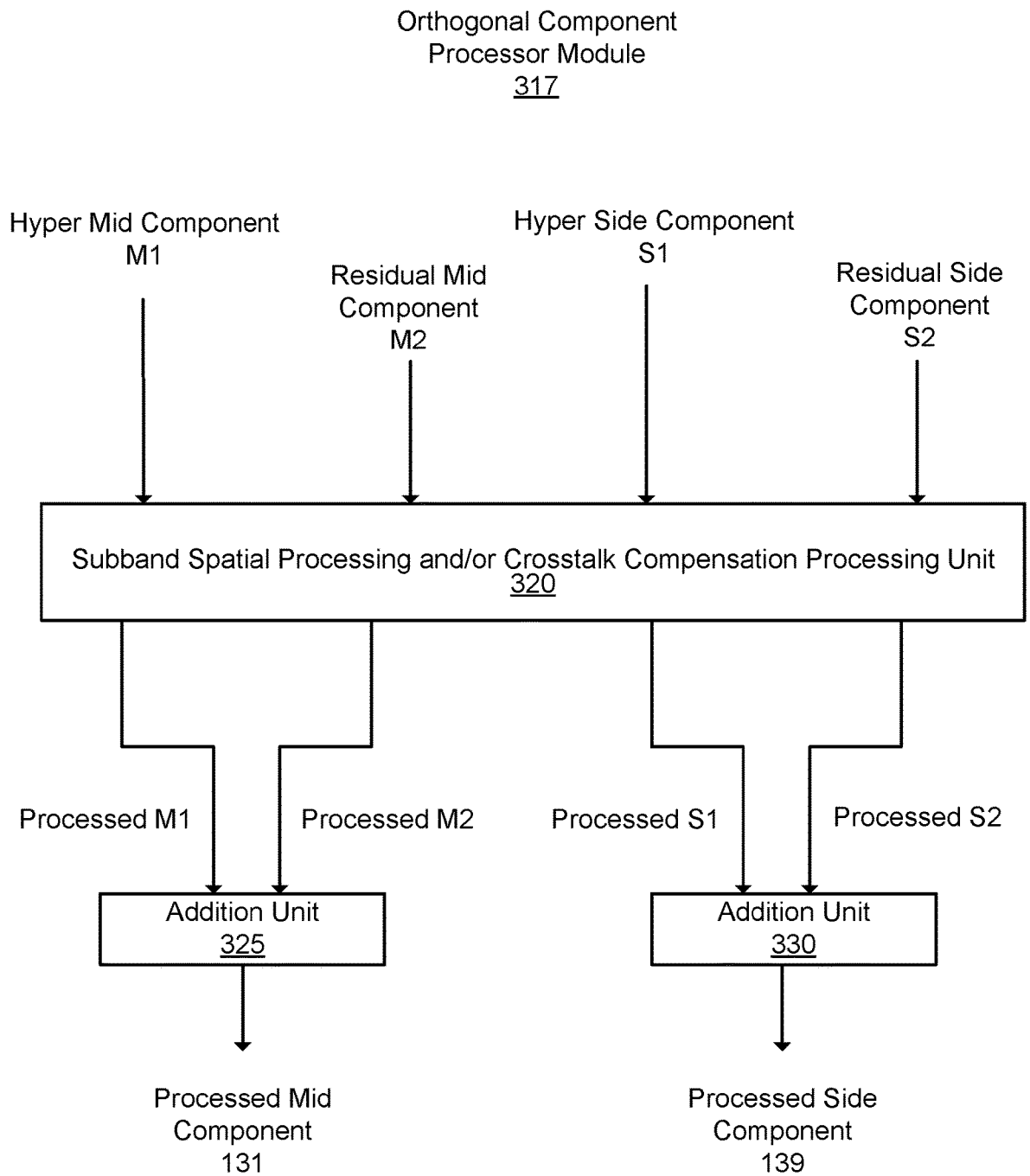
FIG. 3 is a block diagram of an orthogonal component processor, in accordance with one or more embodiments.

FIG. 3 is a block diagram of an orthogonal component processor module 317, in accordance with one or more embodiments. The orthogonal component processor module 317 is an example of the orthogonal component processor module 117. The orthogonal component processor module 317 may include a subband spatial processing and/or crosstalk compensation processing unit 320, an addition unit 325, and an addition unit 330. The orthogonal component processor module 317 performs subband spatial processing and/or crosstalk compensation processing on at least one of the hyper mid component M1, the residual mid component M2, the hyper side component S1, and the residual side component S2. As a result of the subband spatial processing and/or crosstalk compensation processing 320, the orthogonal component processor module 317 outputs at least one of a processed M1, a processed M2, a processed S1, and a processed S2. The addition unit 325 adds the processed M1 and the processed M2 to generate a processed mid component 131, and the addition unit 330 adds the processed S1 and the processed S2 to generate a processed side component 139.

In some embodiments, the orthogonal component processor module 317 performs subband spatial processing and/or crosstalk compensation processing 320 on at least one of the hyper mid component M1, the residual mid component M2, the hyper side component S1, and the residual side component S2 in the frequency domain, generating the processed mid component 131 and the processed side component 139 in the frequency domain. The orthogonal component generator module 113 may provide the components M1, M2, S1, or S2 in the frequency domain to the orthogonal component processor with performing inverse FFTs. After generating the processed mid component 131 and the processed side component 139, the orthogonal component processor module 317 may perform the inverse FFTs on the processed mid component 131 and the processed side component 139 to convert these components back to the time domain. In some embodiments, the orthogonal component processor module 317 performs inverse FFTs on the processed M1, the processed M2, the processed S1, and the processed S2, generating the processed mid component 131 and the processed side component 139 in the time domain.

Figure 4:
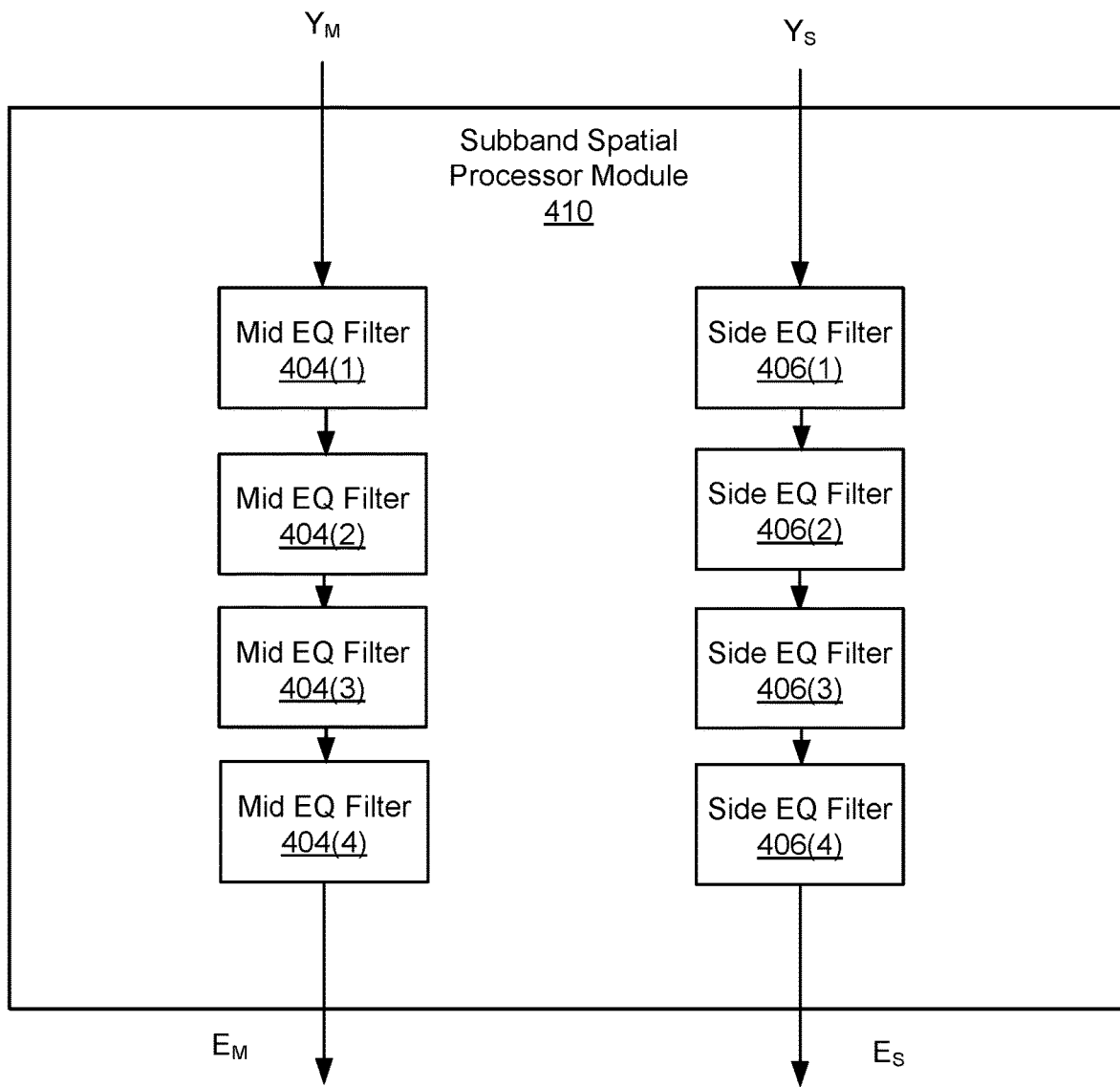
FIG. 4 is a block diagram of a subband spatial processor, in accordance with one or more embodiments.
Figure 5:
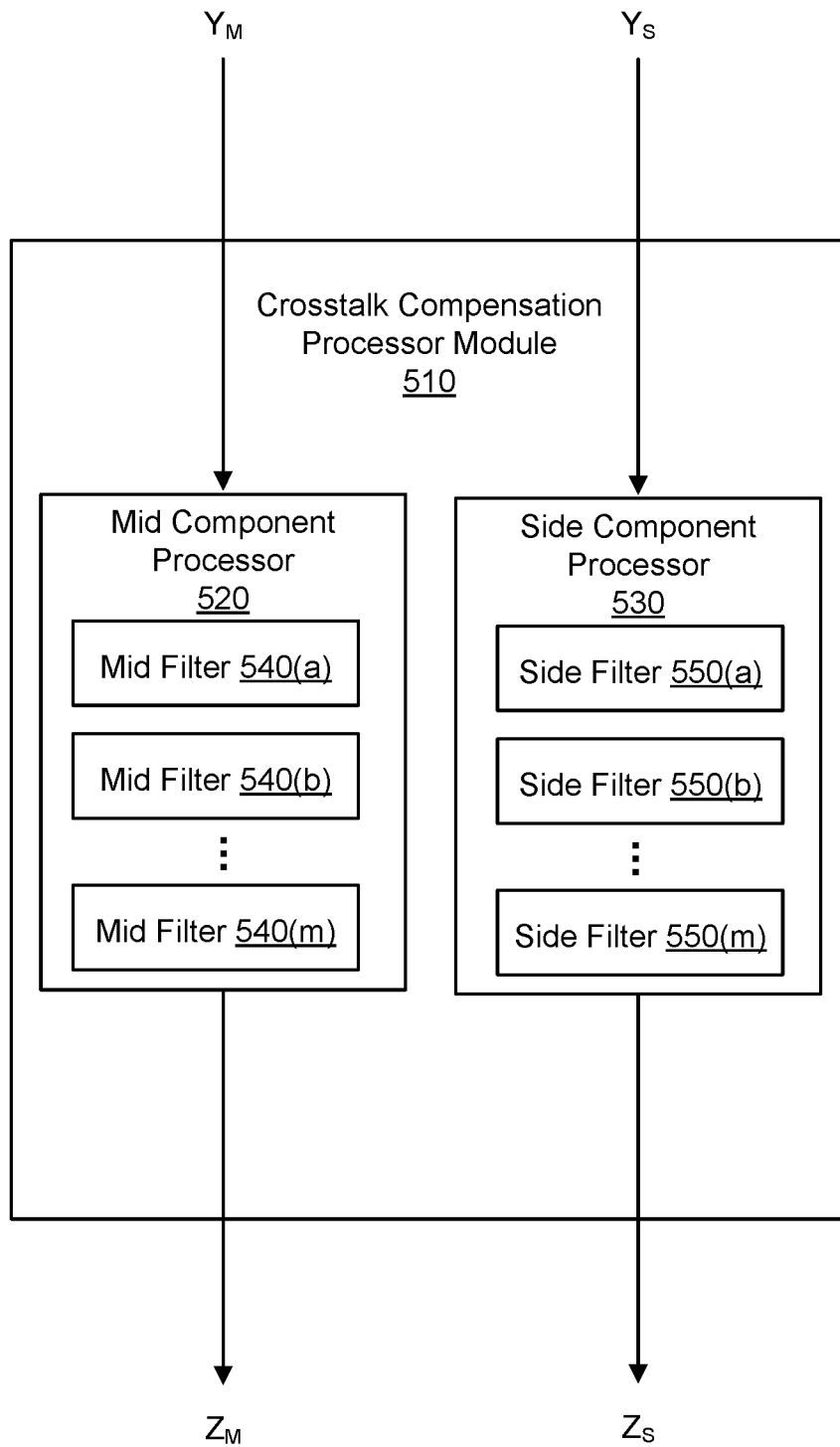
FIG. 5 is a block diagram of a crosstalk compensation processor, in accordance with one or more embodiments.

Examples of the orthogonal component processor module 317 are shown in FIGS. 4 and 5. In some embodiments, the orthogonal component processor module 317 performs both subband spatial processing and crosstalk compensation processing. The processing performed by the orthogonal component processor module 317 is not limited to subband spatial processing or crosstalk compensation processing. Any type of spatial processing using mid/side space may be performed by the orthogonal component processor module 317, such as by using the hyper mid component in place of the mid component or the hyper side component in place of the side component. Some other types of processing may include gain application, amplitude or delay-based panning, binaural processing, reverberation, dynamic range processing such as compression and limiting, as well as other linear or non-linear audio processing techniques and effects ranging from chorus or flanging to machine learning-based approaches to vocal or instrumental style transfer, conversion or re-synthesis, etc.

Example Subband Spatial Processor

FIG. 4 is a block diagram of a subband spatial processor module 410, in accordance with one or more embodiments. The subband spatial processor module 410 is an example of the orthogonal component processor module 317. The subband spatial processor module 410 includes a mid EQ filter 404(1), a mid EQ filter 404(2), a mid EQ filter 404(3), a mid EQ filter 404(4), a side EQ filter 406(1), a side EQ filter 406(2), a side EQ filter 406(3), and a side EQ filter 406(4). In some embodiments, the subband spatial processor module 410 includes components in addition to and/or instead of those described herein.

The subband spatial processor module 410 receives a nonspatial component $Y_m$ and a spatial component $Y_s$ and gain adjusts subbands of one or more of these components to provide a spatial enhancement. The nonspatial component $Y_m$ may be the hyper mid component M1 or the residual mid component M2. The spatial component $Y_s$ may be the hyper side component S1 or the residual side component S2.

The subband spatial processor module 410 receives the nonspatial component $Y_m$ and applies the Mid EQ filters 404(1) to 404(4) to different subbands of $Y_m$ to generate an enhanced nonspatial component $E_m$. The subband spatial processor module 410 also receives the spatial component $Y_s$ and applies the Side EQ filters 406(1) to 406(4) to different subbands of $Y_s$ to generate an enhanced spatial component $E_s$. The subband filters can include various combinations of peak filters, notch filters, low pass filters, high pass filters, low shelf filters, high shelf filters, bandpass filters, bandstop filters, and/or all pass filters. The subband filters may also apply gains to respective subbands. More specifically, the subband spatial processor module 410 includes a subband filter for each of n frequency subbands of the nonspatial component $Y_m$ and a subband filter for each of the n subbands of the spatial component $Y_s$. For n=4 subbands, for example, the subband spatial processor module 410 includes a series of subband filters for the nonspatial component $Y_m$ including a mid equalization (EQ) filter 404(1) for the subband (1), a mid EQ filter 404(2) for the subband (2), a mid EQ filter 404(3) for the subband (3), and a mid EQ filter 404(4) for the subband (4). Each mid EQ filter 404 applies a filter to a frequency subband portion of the nonspatial component $Y_m$ to generate the enhanced nonspatial component $E_m$.

The subband spatial processor module 410 further includes a series of subband filters for the frequency subbands of the spatial component $Y_s$, including a side equalization (EQ) filter 406(1) for the subband (1), a side EQ filter 406(2) for the subband (2), a side EQ filter 406(3) for the subband (3), and a side EQ filter 406(4) for the subband (4). Each side EQ filter 406 applies a filter to a frequency subband portion of the spatial component $Y_s$ to generate the enhanced spatial component $E_s$.

Each of the n frequency subbands of the nonspatial component $Y_m$ and the spatial component $Y_s$ may correspond with a range of frequencies. For example, the frequency subband (1) may corresponding to 0 to 300 Hz, the frequency subband (2) may correspond to 300 to 510 Hz, the frequency subband (3) may correspond to 510 to 2700 Hz, and the frequency subband (4) may correspond to 2700 Hz to Nyquist frequency. In some embodiments, the n frequency subbands are a consolidated set of critical bands. The critical bands may be determined using a corpus of audio samples from a wide variety of musical genres. A long term average energy ratio of mid to side components over the 24 Bark scale critical bands is determined from the samples. Contiguous frequency bands with similar long term average ratios are then grouped together to form the set of critical bands. The range of the frequency subbands, as well as the number of frequency subbands, may be adjustable.

In some embodiments, the subband spatial processor module 410 processes the residual mid component M2 as nonspatial component $Y_m$ and uses one of the side component, the hyper side component S1, or the residual side component S2 as the spatial component $Y_s$.

In some embodiments, the subband spatial processor module 410 processes one or more of the hyper mid component M1, hyper side component S1, residual mid component M2, and residual side component S2. The filters applied to the subbands of each of these components may be different. The hyper mid component M1 and residual mid component M2 may each be processed as discussed for the nonspatial component $Y_m$. The hyper side component S1 and residual side component S2 may each be processed as discussed for the spatial component $Y_s$.

Example Crosstalk Compensation Processor

FIG. 5 is a block diagram of a crosstalk compensation processor module 510, in accordance with one or more embodiments. The crosstalk compensation processor module 510 is an example of the orthogonal component processor module 317. The crosstalk compensation processor module 510 includes a mid component processor 520 and a side component processor 530. The crosstalk compensation processor module 510 receives a nonspatial component $Y_m$ and a spatial component $Y_s$ and applies filters to one or more of these components to compensate for spectral defects caused by (e.g., subsequent or prior) crosstalk processing. The nonspatial component $Y_m$ may be the hyper mid component M1 or the residual mid component M2. The spatial component $Y_s$ may be the hyper side component S1 or the residual side component S2.

The crosstalk compensation processor module 510 receives the nonspatial component $Y_m$ and the mid component processor 520 applies a set of filters to generate an enhanced nonspatial crosstalk compensated component $Z_m$. The crosstalk compensation processor module 510 also receives the spatial subband component $Y_s$ and applies a set of filters in a side component processor 530 to generate an enhanced spatial subband component $E_s$. The mid component processor 520 includes a plurality of filters 540, such as m mid filters 540(a), 540(b), through 540(m). Here, each of the m mid filters 540 processes one of m frequency bands of the nonspatial component $Y_m$. The mid component processor 520 accordingly generates a mid crosstalk compensation channel $Z_m$ by processing the nonspatial component $Y_m$. In some embodiments, the mid filters 540 are configured using a frequency response plot of the nonspatial $Y_m$ with crosstalk processing through simulation. In addition, by analyzing the frequency response plot, any spectral defects such as peaks or troughs in the frequency response plot over a predetermined threshold (e.g., 10 dB) occurring as an artifact of the crosstalk processing can be estimated. These artifacts result primarily from the summation of the delayed and possibly inverted contralateral signals with their corresponding ipsilateral signal in the crosstalk processing, thereby effectively introducing a comb filter-like frequency response to the final rendered result. The mid crosstalk compensation channel $Z_m$ can be generated by the mid component processor 520 to compensate for the estimated peaks or troughs, where each of the m frequency bands corresponds with a peak or trough. Specifically, based on the specific delay, filtering frequency, and gain applied in the crosstalk processing, peaks and troughs shift up and down in the frequency response, causing variable amplification and/or attenuation of energy in specific regions of the spectrum. Each of the mid filters 540 may be configured to adjust for one or more of the peaks and troughs.

The side component processor 530 includes a plurality of filters 550, such as m side filters 550(a), 550(b) through 550(m). The side component processor 530 generates a side crosstalk compensation channel $Z_s$ by processing the spatial component $Y_s$. In some embodiments, a frequency response plot of the spatial $Y_s$ with crosstalk processing can be obtained through simulation. By analyzing the frequency response plot, any spectral defects such as peaks or troughs in the frequency response plot over a predetermined threshold (e.g., 10 dB) occurring as an artifact of the crosstalk processing can be estimated. The side crosstalk compensation channel $Z_s$ can be generated by the side component processor 530 to compensate for the estimated peaks or troughs. Specifically, based on the specific delay, filtering frequency, and gain applied in the crosstalk processing, peaks and troughs shift up and down in the frequency response, causing variable amplification and/or attenuation of energy in specific regions of the spectrum. Each of the side filters 550 may be configured to adjust for one or more of the peaks and troughs. In some embodiments, the mid component processor 520 and the side component processor 530 may include a different number of filters.

In some embodiments, the mid filters 540 and side filters 550 may include a biquad filter having a transfer function defined by Equation 1:

$$H(z) = \frac{b_0 + b_1 z^{-1} + b_2 z^{-2}}{a_0 + a_1 z^{-1} + a_2 z^{-2}} \quad \text{Eq. (1)}$$

where z is a complex variable, and $a_0$, $a_1$, $a_2$, $b_0$, $b_1$, and $b_2$ are digital filter coefficients. One way to implement such a filter is the direct form I topology as defined by Equation 2:

$$Y[n] = \frac{b_0}{a_0} X[n-1] + \frac{b_1}{a_0} X[n-1] + \\ \frac{b_2}{a_0} X[n-2] - \frac{a_1}{a_0} Y[n-1] - \frac{a_2}{a_0} Y[n-2] \quad \text{Eq. (2)}$$

where X is the input vector, and Y is the output. Other topologies may be used, depending on their maximum word-length and saturation behaviors. The biquad can then be used to implement a second-order filter with real-valued inputs and outputs. To design a discrete-time filter, a continuous-time filter is designed, and then transformed into discrete time via a bilinear transform. Furthermore, resulting shifts in center frequency and bandwidth may be compensated using frequency warping.

For example, a peaking filter may have an S-plane transfer function defined by Equation 3:

$$H(s) = \frac{s^2 + s(A/Q) + 1}{s^2 + s(A/Q) + 1} \quad \text{Eq. (3)}$$

where s is a complex variable, A is the amplitude of the peak, and Q is the filter "quality," and the digital filter coefficients are defined by:

$$b_0 = 1 + \alpha A$$
$$b_1 = -2 * \cos(\omega_0)$$
$$b_2 = 1 - \alpha A$$
$$a_0 = 1 + \frac{\alpha}{A}$$
$$a_1 = -2\cos(\omega_0)$$
$$a_2 = 1 + \frac{\alpha}{A}$$

where $\omega_0$ is the center frequency of the filter in radians and $$\alpha = \frac{\sin(\omega_0)}{2Q}.$$

Furthermore, the filter quality Q may be defined by Equation 4:

$$Q = \frac{f_c}{\Delta f} \quad \text{Eq. (4)}$$

where $\Delta f$ is a bandwidth and $f_c$ is a center frequency. The mid filters 540 are shown as being in a series, and the side filters 550 are shown as being in a series. In some embodiments, the mid filters 540 are applied in parallel to the mid component $Y_m$, and the side filters are applied in parallel to the side component $Y_s$.

In some embodiments, the crosstalk compensation processor module 510 processes each of the hyper mid component M1, hyper side component S1, residual mid component M2, and residual side component S2. The filters applied to of each of these components may be different.

Example Crosstalk Processor

Figure 6:
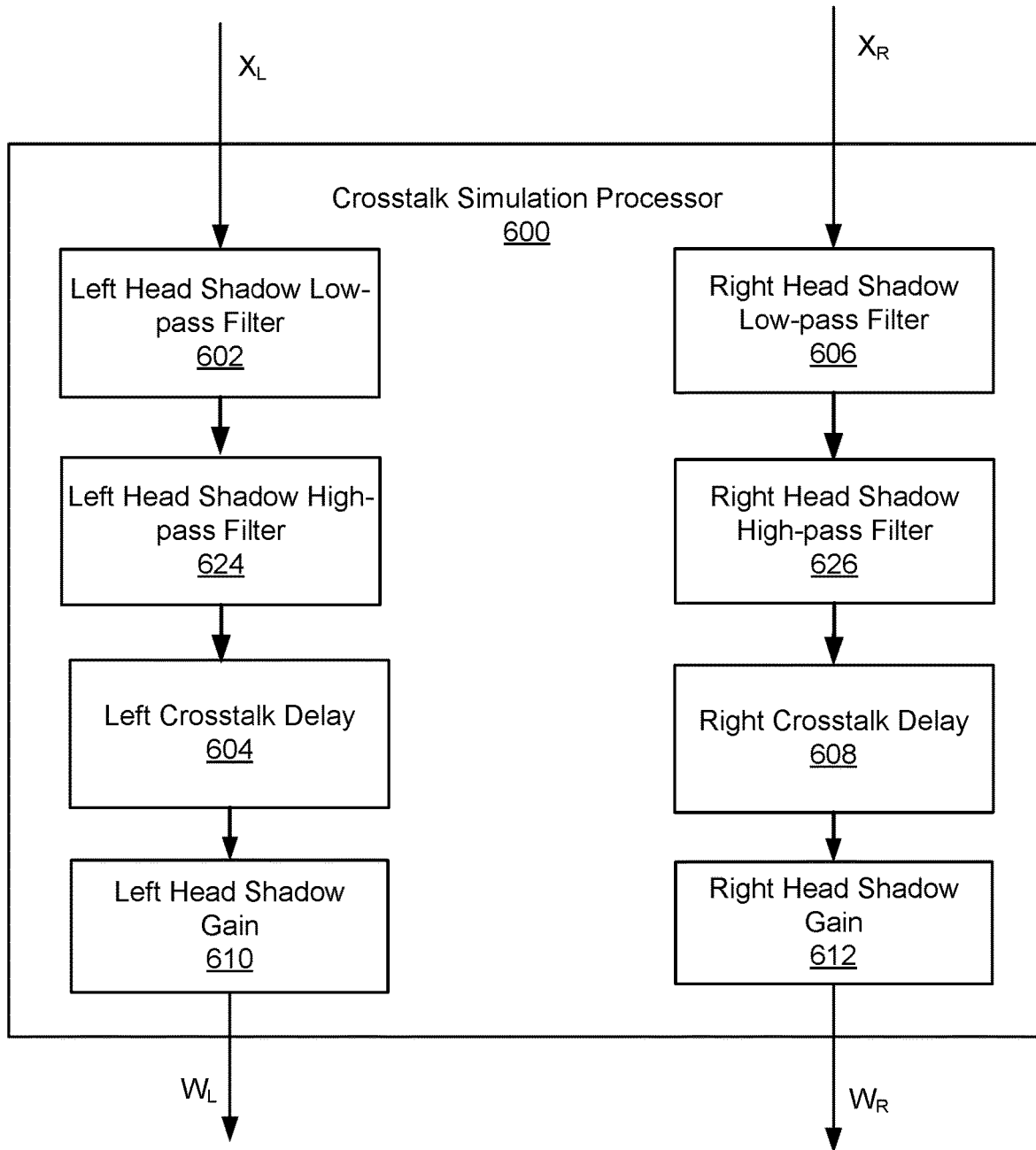
FIG. 6 is a block diagram of a crosstalk simulation processor, in accordance with one or more embodiments.

FIG. 6 is a block diagram of a crosstalk simulation processor module 600, in accordance with one or more embodiments. As mentioned with respect to FIG. 1, in some embodiments, the audio processing system 100 includes a crosstalk processor module 141 that applies crosstalk processing to the processed left component 151 and the processed right component 159. Crosstalk processing includes, for example, crosstalk simulation and crosstalk cancellation. In some embodiments, the crosstalk processor module 141 includes the crosstalk simulation processor module 600. The crosstalk simulation processor module 600 generates contralateral sound components for output to the stereo headphones, thereby providing a loudspeaker-like listening experience on headphones. The left input channel $X_L$ may be the processed left component 151 and the right input channel $X_R$ may be the processed right component 159. In some embodiments, crosstalk simulation may be performed prior to orthogonal component processing.

The crosstalk simulation processor module 600 includes a left head shadow low-pass filter 602, a left head shadow high-pass filter 624, a left cross-talk delay 604, and a left head shadow gain 610 to process the left input channel $X_L$. The crosstalk simulation processor module 600 further includes a right head shadow low-pass filter 606, a right head shadow high-pass filter 626, a right cross-talk delay 608, and a right head shadow gain 612 to process the right input channel $X_R$. The left head shadow low-pass filter 602 and left head shadow high-pass filter 624 apply modulation on the left input channel $X_L$ that models the frequency response of the signal after passing through the listener's head. The output of the left head shadow high-pass filter 624 is provided to the left crosstalk delay 604, which applies a time delay. The time delay represents transaural distance that is traversed by a contralateral sound component relative to an ipsilateral sound component. The left head shadow gain 610 applies a gain to the output of the left crosstalk delay 604 to generate the right left simulation channel $W_L$.

Similarly for the right input channel $X_R$, the right head shadow low-pass filter 606 and right head shadow high-pass filter 626 apply modulation to the right input channel $X_R$ that models the frequency response of the listener's head. The output of the right head shadow high-pass filter 626 is provided to the right crosstalk delay 608, which applies a time delay. The right head shadow gain 612 applies a gain to the output of the right crosstalk delay 608 to generate the right crosstalk simulation channel $W_R$.

The application of the head shadow low-pass filter, head shadow high-pass filter, crosstalk delay, and head shadow gain for each of the left and right channels may be performed in different orders.

Figure 7:
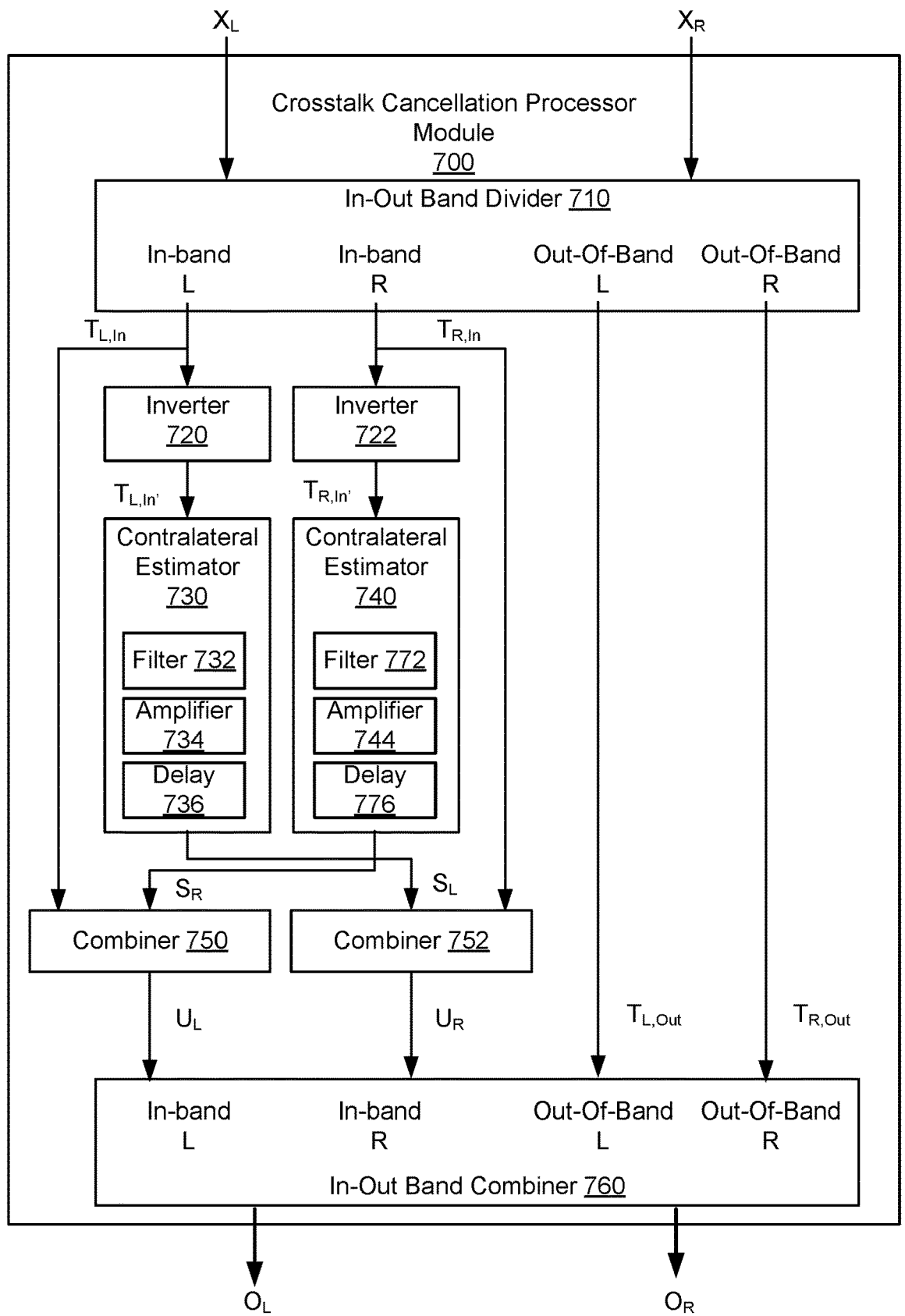
FIG. 7 is a block diagram of a crosstalk cancellation processor, in accordance with one or more embodiments.

FIG. 7 is a block diagram of a crosstalk cancellation processor module 700, in accordance with one or more embodiments. The crosstalk processor module 141 may include the crosstalk cancellation processor module 700. The crosstalk cancellation processor module 700 receives a left input channel $X_L$ and the right input channel $X_R$, and performs crosstalk cancellation on the channels $X_L$, $X_R$ to generate the left output channel $O_L$, and the right output channel $O_R$. The left input channel $X_L$ may be the processed left component 151 and the right input channel $X_R$ may be the processed right component 159. In some embodiments, crosstalk cancellation may be performed prior to orthogonal component processing.

The crosstalk cancellation processor module 700 includes an in-out band divider 710, inverters 720 and 722, contralateral estimators 730 and 740, combiners 750 and 752, and an in-out band combiner 760. These components operate together to divide the input channels $T_L$, $T_R$ into in-band components and out-of-band components, and perform a crosstalk cancellation on the in-band components to generate the output channels $O_L$, $O_R$.

By dividing the input audio signal T into different frequency band components and by performing crosstalk cancellation on selective components (e.g., in-band components), crosstalk cancellation can be performed for a particular frequency band while obviating degradations in other frequency bands. If crosstalk cancellation is performed without dividing the input audio signal T into different frequency bands, the audio signal after such crosstalk cancellation may exhibit significant attenuation or amplification in the nonspatial and spatial components in low frequency (e.g., below 350 Hz), higher frequency (e.g., above 12000 Hz), or both. By selectively performing crosstalk cancellation for the in-band (e.g., between 250 Hz and 14000 Hz), where the vast majority of impactful spatial cues reside, a balanced overall energy, particularly in the nonspatial component, across the spectrum in the mix can be retained.

The in-out band divider 710 separates the input channels $T_L$, $T_R$ into in-band channels $T_{L,In}$, $T_{R,In}$ and out of band channels $T_{L,Out}$, $T_{R,Out}$ respectively. Particularly, the in-out band divider 710 divides the left enhanced compensation channel $T_L$ into a left in-band channel $T_{L,In}$ and a left out-of-band channel $T_{L,Out}$. Similarly, the in-out band divider 710 separates the right enhanced compensation channel $T_R$ into a right in-band channel $T_{R,In}$ and a right out-of-band channel $T_{R,Out}$. Each in-band channel may encompass a portion of a respective input channel corresponding to a frequency range including, for example, 250 Hz to 14 kHz. The range of frequency bands may be adjustable, for example according to speaker parameters.

The inverter 720 and the contralateral estimator 730 operate together to generate a left contralateral cancellation component $S_L$ to compensate for a contralateral sound component due to the left in-band channel $T_{L,In}$. Similarly, the inverter 722 and the contralateral estimator 740 operate together to generate a right contralateral cancellation component $S_R$ to compensate for a contralateral sound component due to the right in-band channel $T_{R,In}$.

In one approach, the inverter 720 receives the in-band channel $T_{L,In}$ and inverts a polarity of the received in-band channel $T_{L,In}$ to generate an inverted in-band channel $T_{L,In}'$. The contralateral estimator 730 receives the inverted in-band channel $T_{L,In}'$, and extracts a portion of the inverted in-band channel $T_{L,In}'$ corresponding to a contralateral sound component through filtering. Because the filtering is performed on the inverted in-band channel $T_{L,In}'$, the portion extracted by the contralateral estimator 730 becomes an inverse of a portion of the in-band channel $T_{L,In}$ attributing to the contralateral sound component. Hence, the portion extracted by the contralateral estimator 730 becomes a left contralateral cancellation component $S_L$, which can be added to a counterpart in-band channel $T_{R,In}$ to reduce the contralateral sound component due to the in-band channel $T_{L,In}$. In some embodiments, the inverter 720 and the contralateral estimator 730 are implemented in a different sequence.

The inverter 722 and the contralateral estimator 740 perform similar operations with respect to the in-band channel $T_{R,In}$ to generate the right contralateral cancellation component $S_R$. Therefore, detailed description thereof is omitted herein for the sake of brevity.

In one example implementation, the contralateral estimator 730 includes a filter 732, an amplifier 734, and a delay unit 736. The filter 732 receives the inverted input channel $T_{L,In}'$ and extracts a portion of the inverted in-band channel $T_{L,In}'$ corresponding to a contralateral sound component through a filtering function. An example filter implementation is a Notch or Highshelf filter with a center frequency selected between 5000 and 10000 Hz, and Q selected between 0.5 and 1.0. Gain in decibels ($G_{dB}$) may be derived from Equation 5:

$$G_{dB} = -3.0 - \log_{1.333}(D) \quad \text{Eq. (5)}$$

where D is a delay amount by delay unit 736 and 646 in samples, for example, at a sampling rate of 48 KHz. An alternate implementation is a Lowpass filter with a corner frequency selected between 5000 and 10000 Hz, and Q selected between 0.5 and 1.0. Moreover, the amplifier 734 amplifies the extracted portion by a corresponding gain coefficient $G_{L,In}$, and the delay unit 736 delays the amplified output from the amplifier 734 according to a delay function D to generate the left contralateral cancellation component $S_L$. The contralateral estimator 740 includes a filter 772, an amplifier 744, and a delay unit 776 that performs similar operations on the inverted in-band channel $T_{R,In}'$ to generate the right contralateral cancellation component $S_R$. In one example, the contralateral estimators 730, 740 generate the left and right contralateral cancellation components $S_L$, $S_R$, according to equations below:

$$S_L = D[G_{L,In} * F[T_{L,In}']] \quad \text{Eq. (6)}$$

$$S_R = D[G_{R,In} * F[T_{R,In}']] \quad \text{Eq. (7)}$$

where F[ ] is a filter function, and D[ ] is the delay function.

The configurations of the crosstalk cancellation can be determined by speaker parameters. In one example, filter center frequency, delay amount, amplifier gain, and filter gain can be determined, according to an angle formed between two speakers with respect to a listener. In some embodiments, values between the speaker angles are used to interpolate other values.

The combiner 750 combines the right contralateral cancellation component $S_R$ to the left in-band channel $T_{L,In}$ to generate a left in-band crosstalk channel $U_L$, and the combiner 752 combines the left contralateral cancellation component $S_L$ to the right in-band channel $T_{R,In}$ to generate a right in-band crosstalk channel $U_R$. The in-out band combiner 760 combines the left in-band crosstalk channel $U_L$ with the out-of-band channel $T_{L,Out}$ to generate the left output channel $O_L$, and combines the right in-band crosstalk channel $U_R$ with the out-of-band channel $T_{R,Out}$ to generate the right output channel $O_R$.

Accordingly, the left output channel $O_L$ includes the right contralateral cancellation component $S_R$ corresponding to an inverse of a portion of the in-band channel $T_{R,In}$ attributing to the contralateral sound, and the right output channel $O_R$ includes the left contralateral cancellation component $S_L$ corresponding to an inverse of a portion of the in-band channel $T_{L,In}$ attributing to the contralateral sound. In this configuration, a wavefront of an ipsilateral sound component output by a right loudspeaker according to the right output channel $O_R$ arrived at the right ear can cancel a wavefront of a contralateral sound component output by a left loudspeaker according to the left output channel $O_L$. Similarly, a wavefront of an ipsilateral sound component output by the left loudspeaker according to the left output channel $O_L$ arrived at the left ear can cancel a wavefront of a contralateral sound component output by the right loudspeaker according to right output channel $O_R$. Thus, contralateral sound components can be reduced to enhance spatial detectability.

Orthogonal Component Spatial Processing

Figure 8:
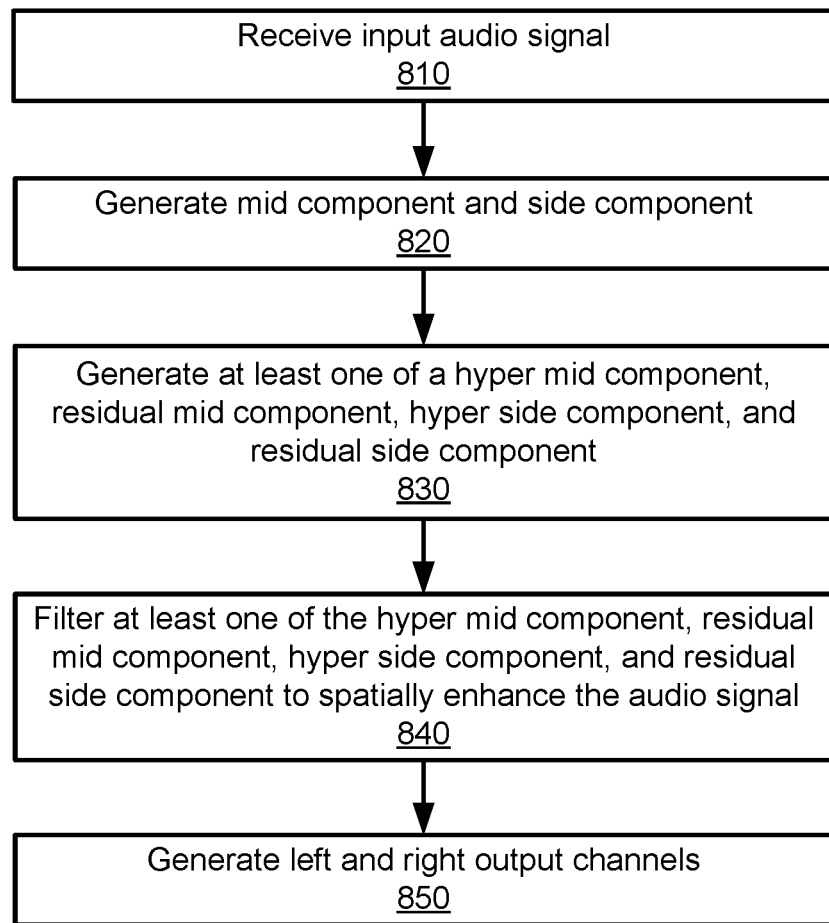
FIG. 8 is a flowchart of a process for spatial processing using at least one of a hyper mid, residual mid, hyper side, or residual side component, in accordance with one or more embodiments.

FIG. 8 is a flowchart of a process for spatial processing using at least one of a hyper mid, residual mid, hyper side, or residual side component, in accordance with one or more embodiments. The spatial processing may include gain application, amplitude or delay-based panning, binaural processing, reverberation, dynamic range processing such as compression and limiting, linear or non-linear audio processing techniques and effects, chorus effect, flanging effect, machine learning-based approaches to vocal or instrumental style transfer, conversion or re-synthesis, among other things. The process may be performed to provide spatially enhanced audio to a device of a user. The process may include fewer or additional steps, and steps may be performed in different orders.

An audio processing system (e.g., the audio processing system 100) receives 810 an input audio signal (e.g., the left input channel 103 and the right input channel 105). In some embodiments, the input audio signal may be a multi-channel audio signal including multiple left-right channel pairs. Each left-right channel pair may be processed as discussed herein for the left and right input channels.

The audio processing system generates 820 a nonspatial mid component (e.g., the mid component 109) and a spatial side component (e.g., the side component 111) from the input audio signal. In some embodiments, an L/R to M/S converter (e.g., the L/R to M/S converter module 107) performs the conversion of the input audio signal to mid and side components.

The audio processing system generates 830 at least one of a hyper mid component (e.g., the hyper mid component M1), a hyper side component (e.g., the hyper side component S1), a residual mid component (e.g., the residual mid component M2), and a residual side component (e.g., the residual side component S2). The audio processing system may generate at least one and/or all of the components listed above. The hyper mid component includes spectral energy of the side component removed from spectral energy of the mid component. The residual mid component includes spectral energy of the hyper mid component removed from the spectral energy of the mid component. The hyper side component includes spectral energy of the mid component removed from spectral energy of the side component. The residual side component includes spectral energy of the hyper side component removed from spectral energy of the side component. The processing used to generate M1, M2, S1, or S2 may be performed in the frequency domain or the time domain.

The audio processing system filters 840 at least one of the hyper mid component, the residual mid component, the hyper side component, and the residual side component to enhance the audio signal. The filtering may include spatial cue processing, such as by adjusting a frequency dependent amplitude or a frequency dependent delay of the hyper mid component, residual mid component, hyper side component, or residual side component. Some examples of spatial cue processing include amplitude or delay-based panning or binaural processing.

The filtering may include dynamic range processing, such as compression or limiting. For example, the hyper mid component, residual mid component, hyper side component, or residual side component may be compressed according to a compression ratio when a threshold level for compression is exceeded. In another example, the hyper mid component, residual mid component, hyper side component, or residual side component may be limited to a maximum level when a threshold level for limiting is exceeded.

The filtering may include machine-learning based alterations to the hyper mid component, residual mid component, hyper side component, or residual side component. Some examples include machine-learning based vocal or instrumental style transfer, conversion, or re-synthesis.

The filtering of the hyper mid component, residual mid component, hyper side component, or residual side component may include gain application, reverberation, as well as other linear or non-linear audio processing techniques and effects ranging from chorus and/or flanging, or other types of processing. In some embodiments, the filtering may include filtering for subband spatial processing and crosstalk compensation, as discussed in greater detail below in connection with FIG. 9.

The filtering may be performed in the frequency domain or the time domain. In some embodiments, the mid and side components are converted from the time domain into the frequency domain, the hyper and/or residual components are generated in the frequency domain, the filtering is performed in the frequency domain, and the filtered components are converted to the time domain. In other embodiments, the hyper and/or residual components are converted to the time domain, and the filtering is performed in the time domain on these components.

The audio processing system generates 850 a left output channel (e.g., the left output channel 121) and a right output channel (e.g., the right output channel 123) using one or more of the filtered hyper/residual components. For example, conversion from M/S to L/R may be performed using a mid component (e.g., processed mid component 131) or a side component (e.g., processed side component 139) generated from at least one of the filtered hyper mid component, filtered residual mid component, filtered hyper side component, or filtered residual side component. In another example, the filtered hyper mid component or filtered residual mid component may be used as the mid component for M/S to L/R conversion, or the filtered hyper side component or residual side component may be used as the side component for M/S to L/R conversion.

Orthogonal Component Subband Spatial and Crosstalk Processing

Figure 9:
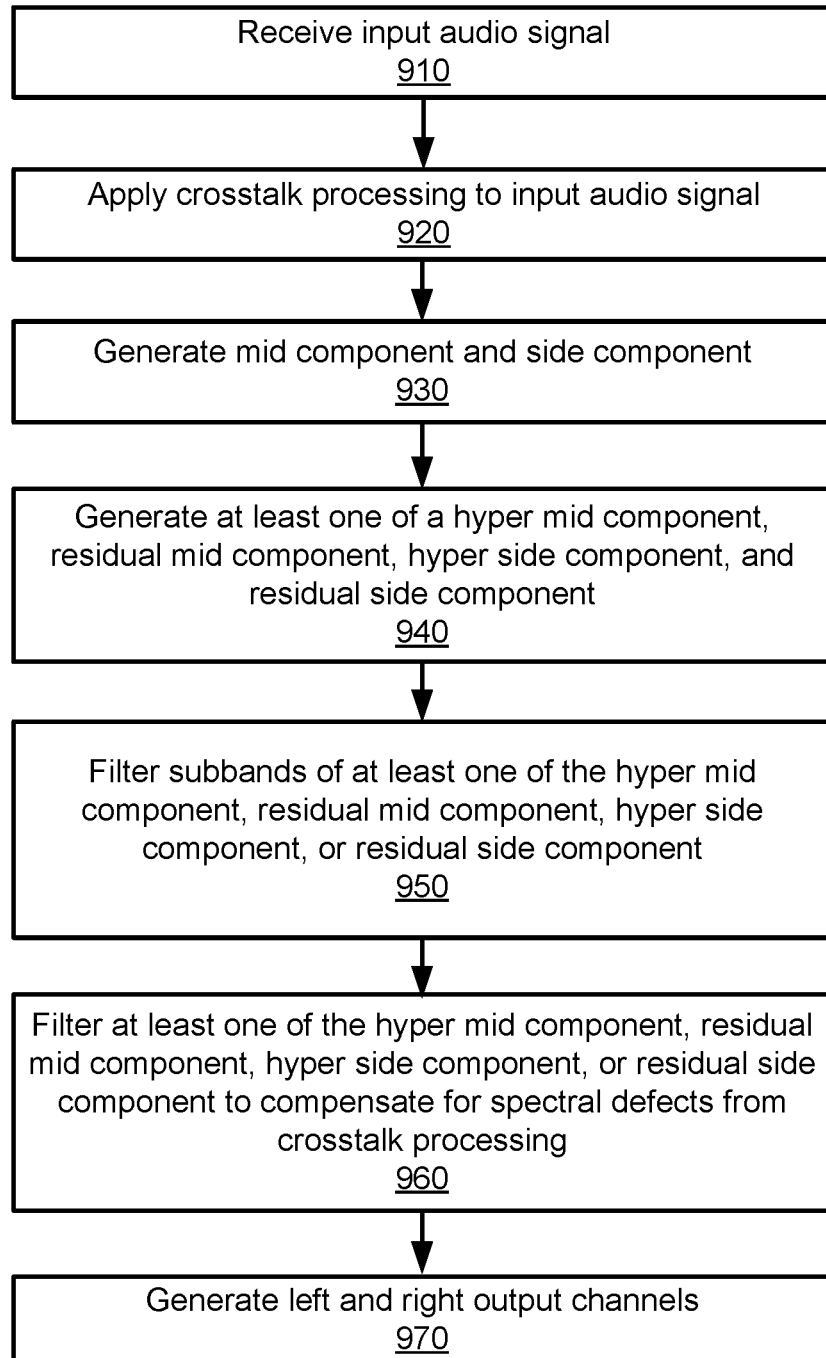
FIG. 9 is a flowchart of a process for subband spatial processing and compensation for crosstalk processing using at least one of a hyper mid, residual mid, hyper side, or residual side component, in accordance with one or more embodiments.

FIG. 9 is a flowchart of a process for subband spatial processing and compensation for crosstalk processing using at least one of a hyper mid, residual mid, hyper side, or residual side component, in accordance with one or more embodiments. The crosstalk processing may include crosstalk cancellation or crosstalk simulation. Subband spatial processing may be performed to provide audio content with enhanced spatial detectability, such as by creating the perception that sounds are directed to the listener from a large area rather than specific points in space corresponding to the locations of the loudspeakers (e.g. soundstage enhancement), and thereby producing a more immersive listening experience to the listener. Crosstalk simulation may be used for audio output to headphones to simulate a loudspeaker experience with contralateral crosstalk. Crosstalk cancellation may be used for audio output to loudspeakers to remove the effects of crosstalk interference. Crosstalk compensation compensates for spectral defects caused by the crosstalk cancellation or crosstalk simulation. The process may include fewer or additional steps, and steps may be performed in different orders. Hyper and residual mid/side components can be manipulated in different ways for different purposes. For example, in the case of crosstalk compensation, targeted subband filtering may be applied only to the hyper mid component M1 (where the majority of the vocal dialog energy in much cinematic content occurs) in an effort to remove spectral artifacts resulting from the crosstalk processing only in that component. In the case of soundstage enhancement with or without crosstalk processing, targeted subband gains may be applied to the residual mid component M2 and residual side component S2. For example, the residual mid component M2 may be attenuated and the residual side component S2 may be inversely amplified to increase the distance between these components from a gain perspective (which, if tastefully done can increase spatial detectability) without creating a drastic overall change in perceptual loudness in the final L/R signal, while also avoiding attenuation in the hyper mid M1 component (e.g., being that portion of the signal that often contains the majority of the vocal energy).

The audio processing system receives 910 the input audio signal, the input audio signal including the left and right channels. In some embodiments, the input audio signal may be a multi-channel audio signal including multiple left-right channel pairs. Each left-right channel pair may be processed as discussed herein for the left and right input channels.

The audio processing system applies 920 crosstalk processing to the received input audio signal. The crosstalk processing includes at least one of crosstalk simulation and crosstalk cancellation.

In steps 930 through 960, the audio processing system performs subband spatial processing and crosstalk compensation for the crosstalk processing using one or more of the hyper mid, hyper side, residual mid, or residual side components. In some embodiments, the crosstalk processing may be performed after the processing in steps 930 through 960.

The audio processing system generates 930 a mid component and a side component from the (e.g., crosstalk processed) audio signal.

The audio processing system generates 940 at least one of a hyper mid component, a residual mid component, a hyper side component, and a residual side component. The audio processing system may generate at least one and/or all of the components listed above.

The audio processing system filters 950 subbands of at least one of the hyper mid component, the residual mid component, hyper side component, and residual side component to apply a subband spatial processing to the audio signal. Each subband may include a range of frequencies, such as may be defined by sets of critical bands. In some embodiments, the subband spatial processing further includes time delaying subbands of at least one of the hyper mid component, the residual mid component, hyper side component, and residual side component.

The audio processing system filters 960 at least one of the hyper mid component, the residual mid component, hyper side component, and residual side component to compensate for spectral defects from the crosstalk processing of the input audio signal. The spectral defects may include peaks or troughs in the frequency response plot of the hyper mid component, the residual mid component, hyper side component, or residual side component over a predetermined threshold (e.g., 10 dB) occurring as an artifact of the crosstalk processing. The spectral defects may be estimated spectral defects.

In some embodiments, the filtering of spectrally orthogonal components for subband spatial processing in step 950 and crosstalk compensation in step 960 may be integrated into a single filtering operation for each spectrally orthogonal component selected for the filtering.

In some embodiments, the filter of the hyper/residual mid/side components for subband spatial processing or crosstalk compensation may be performed in connection with filtering for other purposes, such as gain application, amplitude or delay-based panning, binaural processing, reverberation, dynamic range processing such as compression and limiting, linear or non-linear audio processing techniques and effects ranging from chorus and/or flanging, machine learning-based approaches to vocal or instrumental style transfer, conversion or re-synthesis, or other types of processing using any of the hyper mid component, residual mid component, hyper side component, and residual side component.

The filtering may be performed in the frequency domain or the time domain. In some embodiments, the mid and side components are converted from the time domain into the frequency domain, the hyper and/or residual components are generated in the frequency domain, the filtering is performed in the frequency domain, and the filtered components are converted to the time domain. In other embodiments, the hyper and/or residual components are converted to the time domain, and the filtering is performed in the time domain on these components.

The audio processing system generates 970 a left output channel and a right output channel from the filtered hyper mid component. In some embodiments, the left and right output channels are additionally based on at least one of the filtered residual mid component, filtered hyper side component, and filtered residual side component.

Example Orthogonal Component Audio Processing

FIGS. 10-19 are plots depicting spectral energies of mid and side components of an example white noise signal, in accordance with one or more embodiments.

Figure 10:
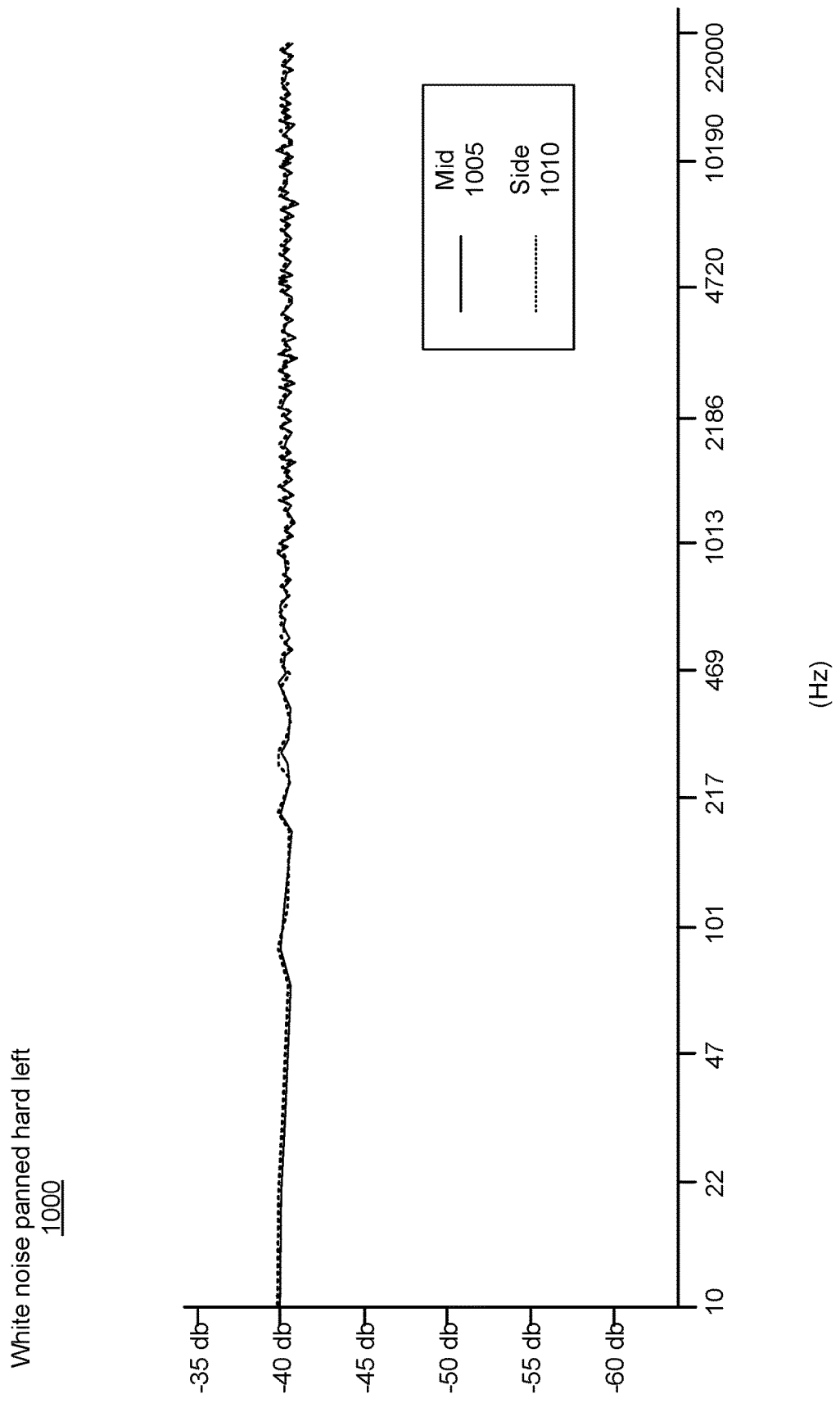
FIGS. 10-19 are plots depicting spectral energies of mid and side components of an example white noise signal, in accordance with one or more embodiments.

FIG. 10 illustrates a plot of a white noise signal panned hard left 1000. A left-right white noise signal is converted into a mid component 1005 and a side component 1010 and panned hard left using the constant-power sin/cosine pan law. When the white noise signal is panned hard left 1000, a user positioned in between a pair of left and right loudspeakers would perceive the sound as appearing at and/or around the left loudspeaker. The white noise signal, split into the left input channel and the right input channel of the white noise signal, may be converted to the mid component 1005 and the side component 1010 using an L/R to M/S converter module 107. As shown in FIG. 10, both the mid component 1005 and the side component 1010 have approximately equal amounts of energy when the white noise signal is panned hard left 1000. Similarly, when the white noise signal is panned hard right (not shown in FIG. 10), the mid and side components would have approximately equal amounts of energy.

Figure 11:
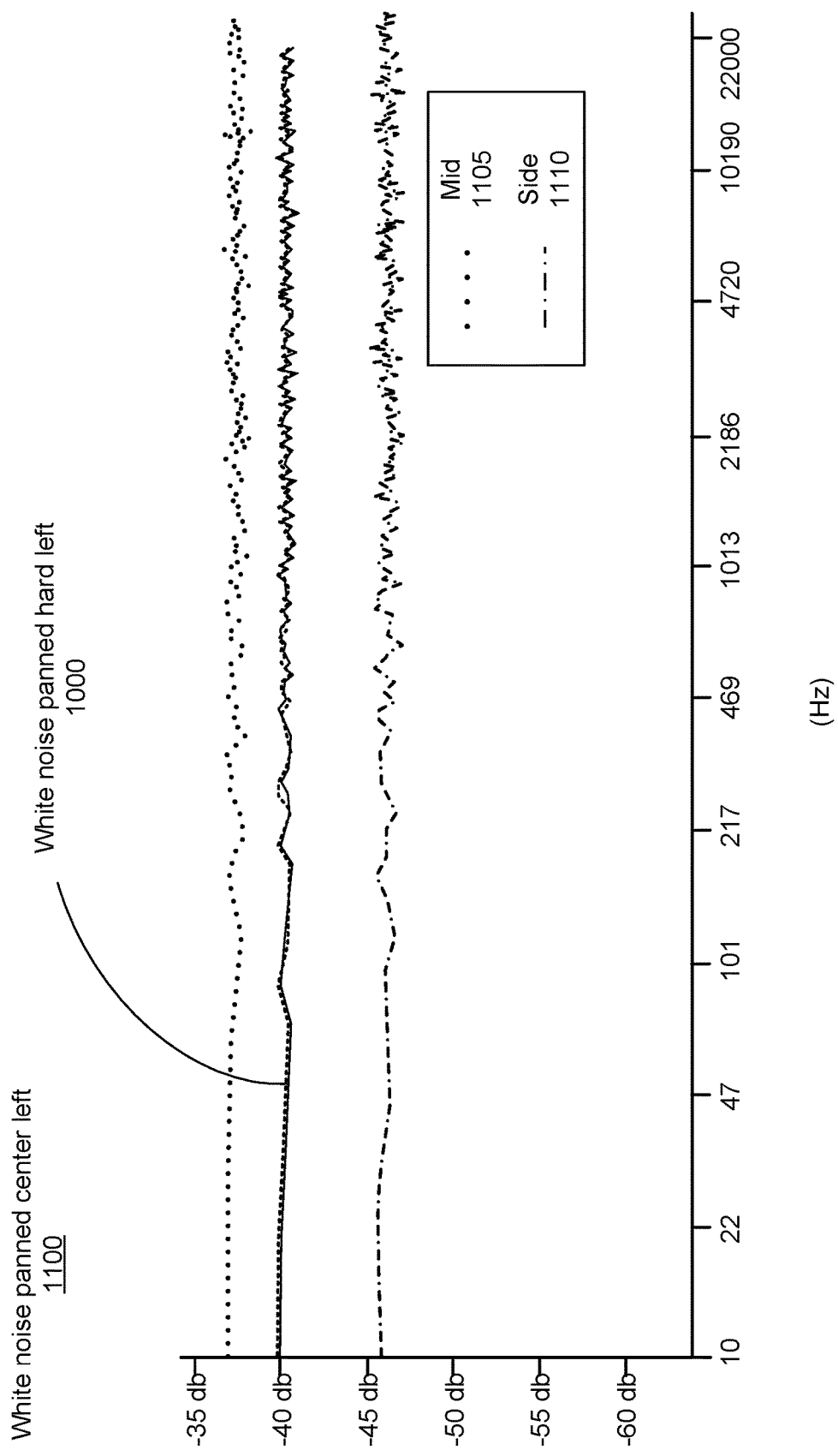

FIG. 11 illustrates a plot of a white noise signal panned center left 1100. When the white noise signal is panned center left 1100 using the common constant-power sine/cosine pan law, a user positioned between the pair of left and right loudspeakers would perceive the sound as appearing midway between the front of the user and the left loudspeaker. FIG. 11 depicts a mid component 1105 and a side component 1110 of the white noise signal panned center left 1100, as well as the white noise signal panned hard left 1000. In comparison to the white noise signal panned hard left 1000, the mid component 1105 increases by approximately 3 dB, whereas the side component 1110 decreases by approximately 6 dB. When the white noise signal is panned center right, the mid component 1105 and the side component 1110 would have similar energies as what is shown in FIG. 11.

Figure 12:
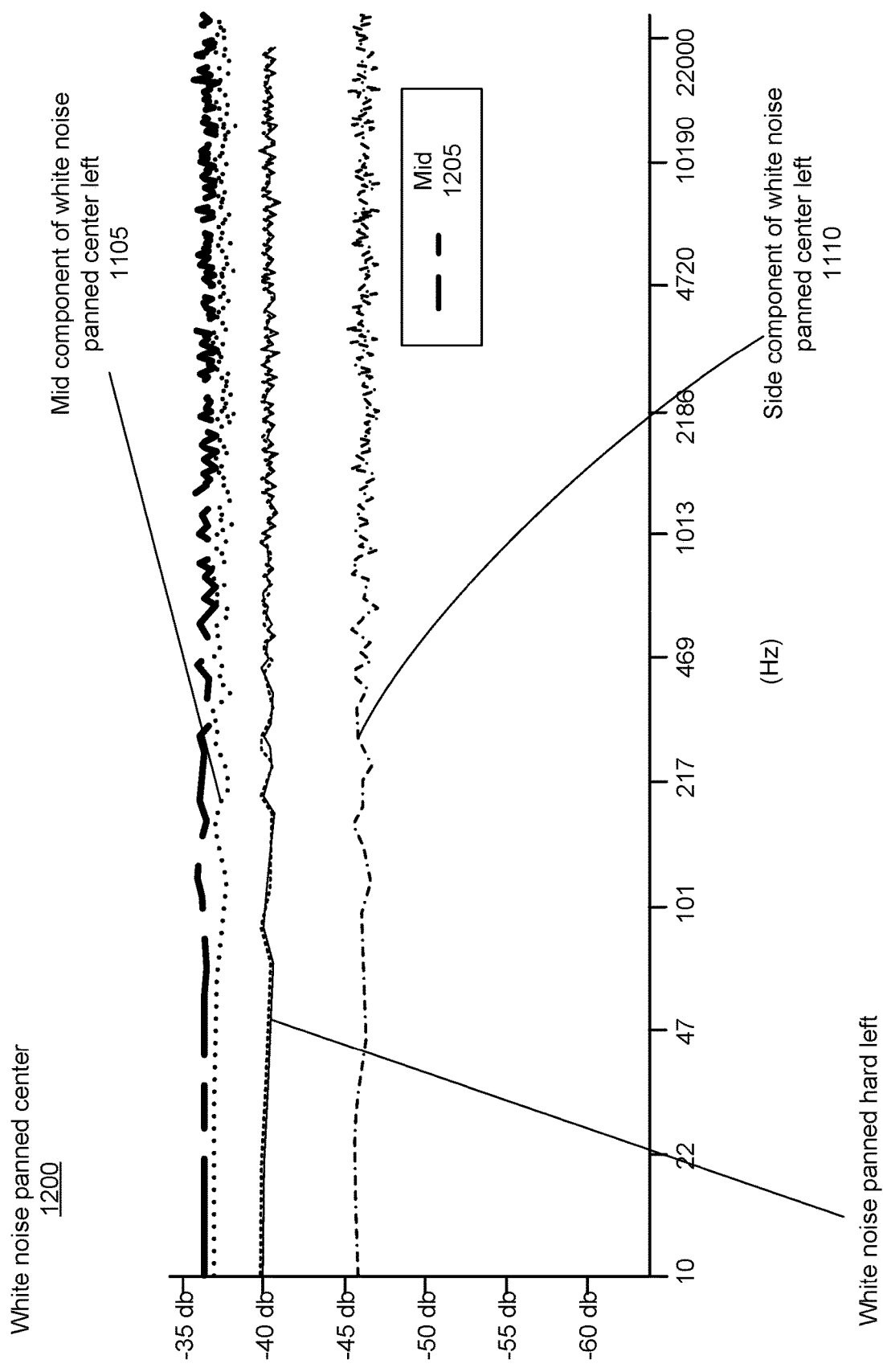

FIG. 12 illustrates a plot of a white noise signal panned center 1200. When the white noise signal is panned center 1200 using the common constant-power sine/cosine pan law, a user positioned between a pair of left and right loudspeakers would perceive the sound as appearing in front of the user (e.g., between the left and right loudspeakers). As shown in FIG. 12, the white noise signal panned center 1200 only has a mid component 1205.

From the above examples in FIGS. 10, 11, and 12, it can be seen that although the mid component contains the sole energy in the signal for center-panned sounds as shown in FIG. 12 (i.e. where the left and right channels are identical), there is also mid component energy in scenarios where the sound in the original L/R stream is typically perceived as off-center as shown in FIGS. 10 and 11 (i.e. sounds panned left or right of center).

Notably, the three above scenarios, which are representative of the vast majority of L/R audio use-cases, do not encompass a scenario where the side comprises the sole energy. This would only be the case when the left and right channels are 180 degrees out of phase (i.e. sign-inverted), which is a rarity in two-channel audio for music and entertainment. So, whereas with the mid component is omnipresent in virtually all two-channel left/right audio streams and also comprises the sole energy in center-panned content, the side component is present in all but center-panned content and rarely, if ever, serves as the sole energy in the signal.

Orthogonal component processing isolates and operates on the portion of the mid and side components that are spectrally "orthogonal" to one another. That is, using orthogonal component processing, the portion of the mid component that corresponds only to the energy present in the center of the soundstage (i.e., the hyper mid component) can be isolated, and likewise the portion of the side component that corresponds only to energy not present in the center of the soundstage (i.e., the hyper side component) can be isolated. Conceptually, the hyper mid component is the energy corresponding to the thin column of sound perceived at the center of the soundstage, loudspeakers and headphones alike. Furthermore, using simple scalars, it is possible to control how "thin" this column is, providing an interpolation space from hyper-mid to mid and the hyper-side to side. Furthermore, as a by-product to deriving our hyper-mid/side components signals, it is also possible to operate on the residual signal (e.g., residual mid and side components) that, together with the hyper mid or hyper side components, combine to form the original complete mid and side components. Each of these four sub-components of mid and side can be processed independently with all manner of operations ranging from simple gain staging, to multi-band EQ, to custom and idiosyncratic effects.

Figure 13:
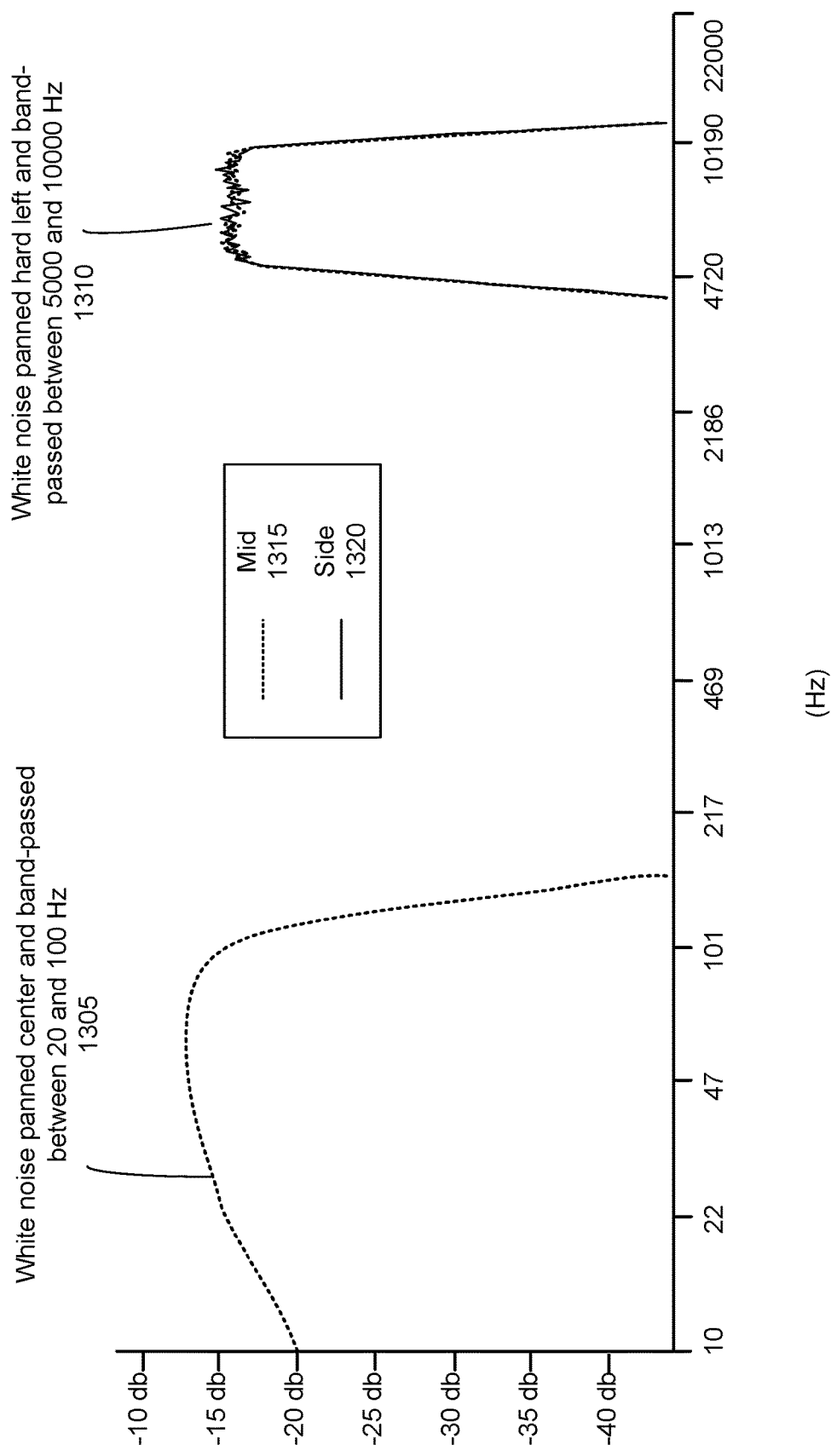

FIGS. 13 through 19 illustrate orthogonal component processing of a white noise signal. FIG. 13 illustrates a plot of a white noise signal panned center and band-passed between 20 and 100 Hz 1305 (e.g., using $8^{th}$ order Butterworth filter) and a white noise signal panned hard left and band-passed between 5000 and 10000 Hz 1310 (e.g., using $8^{th}$ order Butterworth filter), and without orthogonal component processing. The plot depicts a mid component 1315 and a side component 1320 for each of the panned white noise signals 1305 and 1310. The white noise signal panned center 1305 only has energy in its mid component 1315, whereas the white noise signal panned hard left has equal amounts of energy in its mid component 1315 and its side component 1320. This is like the results shown in FIGS. 10 and 12.

Figure 14:
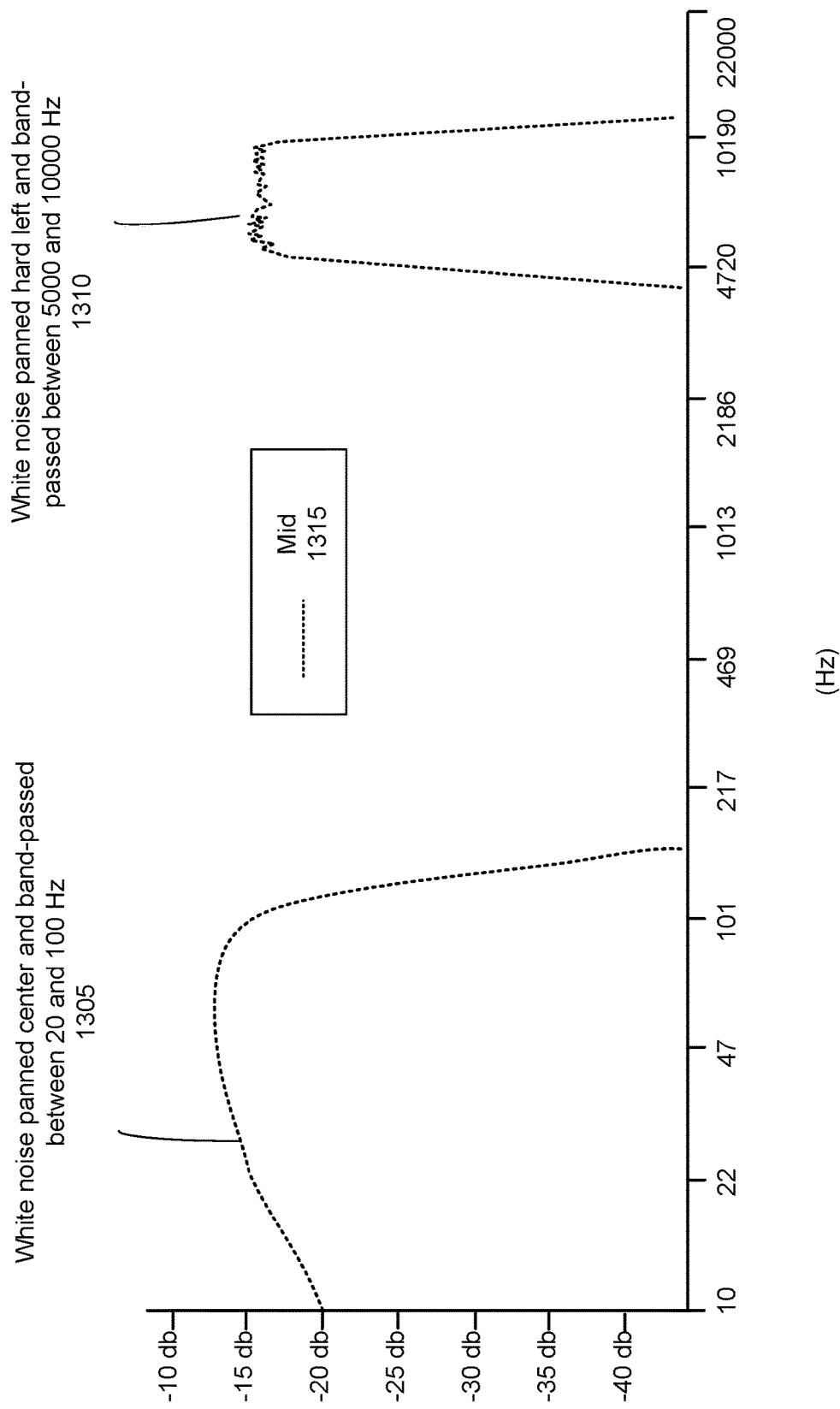

FIG. 14 illustrates the panned white noise signals 1305 and 1310 of FIG. 13 with energy of the side component 1320 removed. The center-panned low band of white noise of signal 1305 is unchanged. The hard-left panned high band of white noise of signal 1310 now has zero side energy while the portion of the energy represented by the mid component 1315 is still present. Even though the side energy is removed, there is still non-center-panned energy present in the mid signal as shown by the signal 1310.

Figure 15:
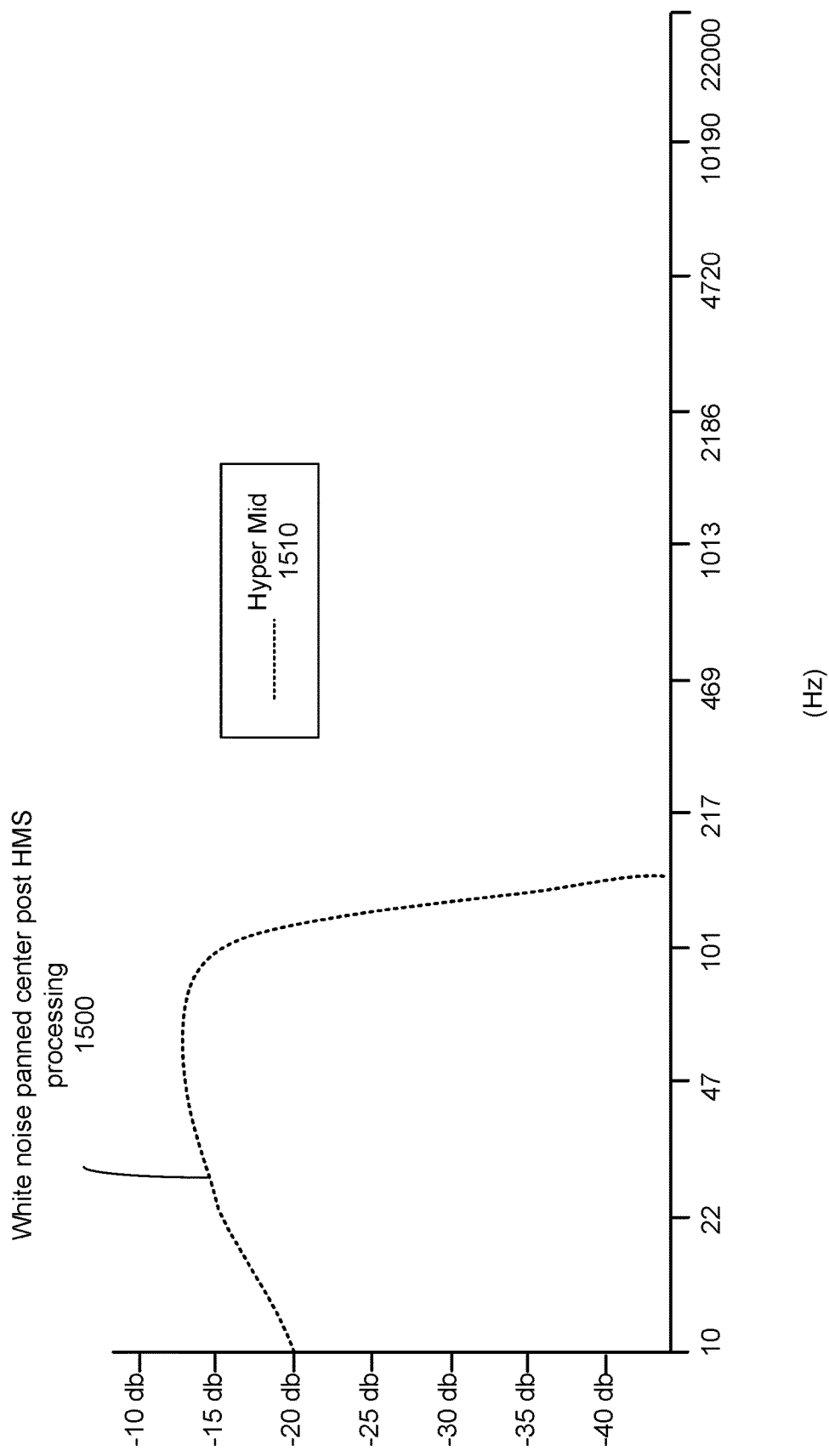

FIG. 15 illustrates the panned white noise signals of FIG. 13 using orthogonal component processing 1500. In particular, orthogonal component processing is used to isolate the hyper mid component 1510 and remove other energy of the audio signal. Here, the signal panned hard left is removed and only a center-panned signal 1500 remains. This demonstrates that the hyper mid component 1510 is an isolation of only the energy in the signal that occupies the very center of the soundstage, and nothing else.

Because it is possible to isolate the hyper mid component of an audio signal, the audio signal can be manipulated to control what elements of the original signal end up in the various M1/M2/S1/S2 components. This pre-processing manipulation can range from simple amplitude and delay adjustments to more complex filtering techniques. Those preprocessing manipulations may then be subsequently inverted in order to restore the original sound stage.

Figure 16:
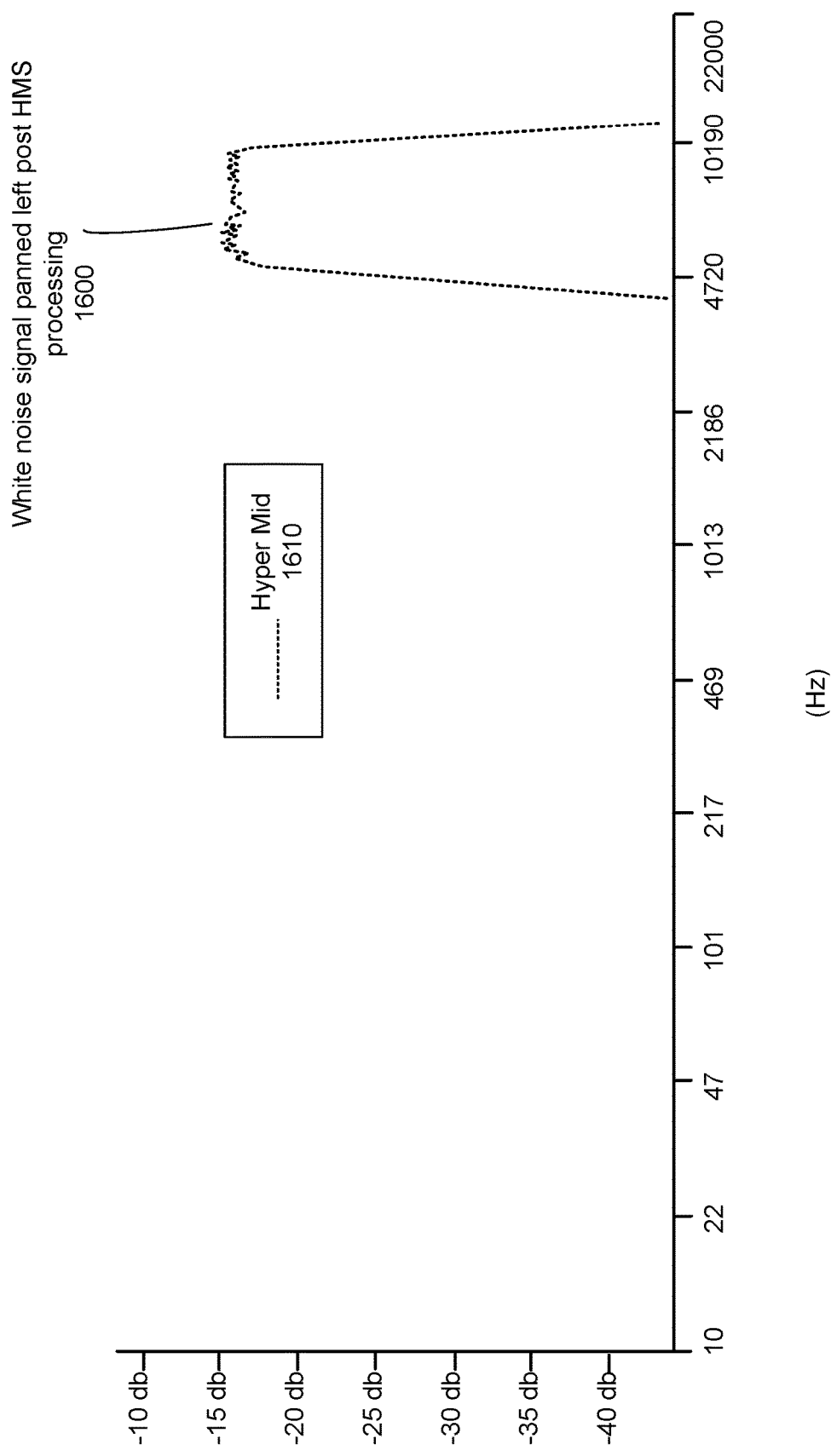

FIG. 16 illustrates another embodiment of the panned white noise signal of FIG. 13 using orthogonal component processing 1600. An L/R audio signal is rotated in such a way that places the hard-left panned high-band white noise (e.g., as shown by signal 1310 in FIG. 13) at the center of the sound stage and shifts the center-panned low-band noise (e.g., as shown by signal 1305 in FIG. 13) away from the center. The white noise signal originally panned hard left and band-passed between 5000 and 10000 Hz 1600 can then be extracted and further processed by isolating the hyper mid component 1610 of the rotated L/R signal.

Figure 17:
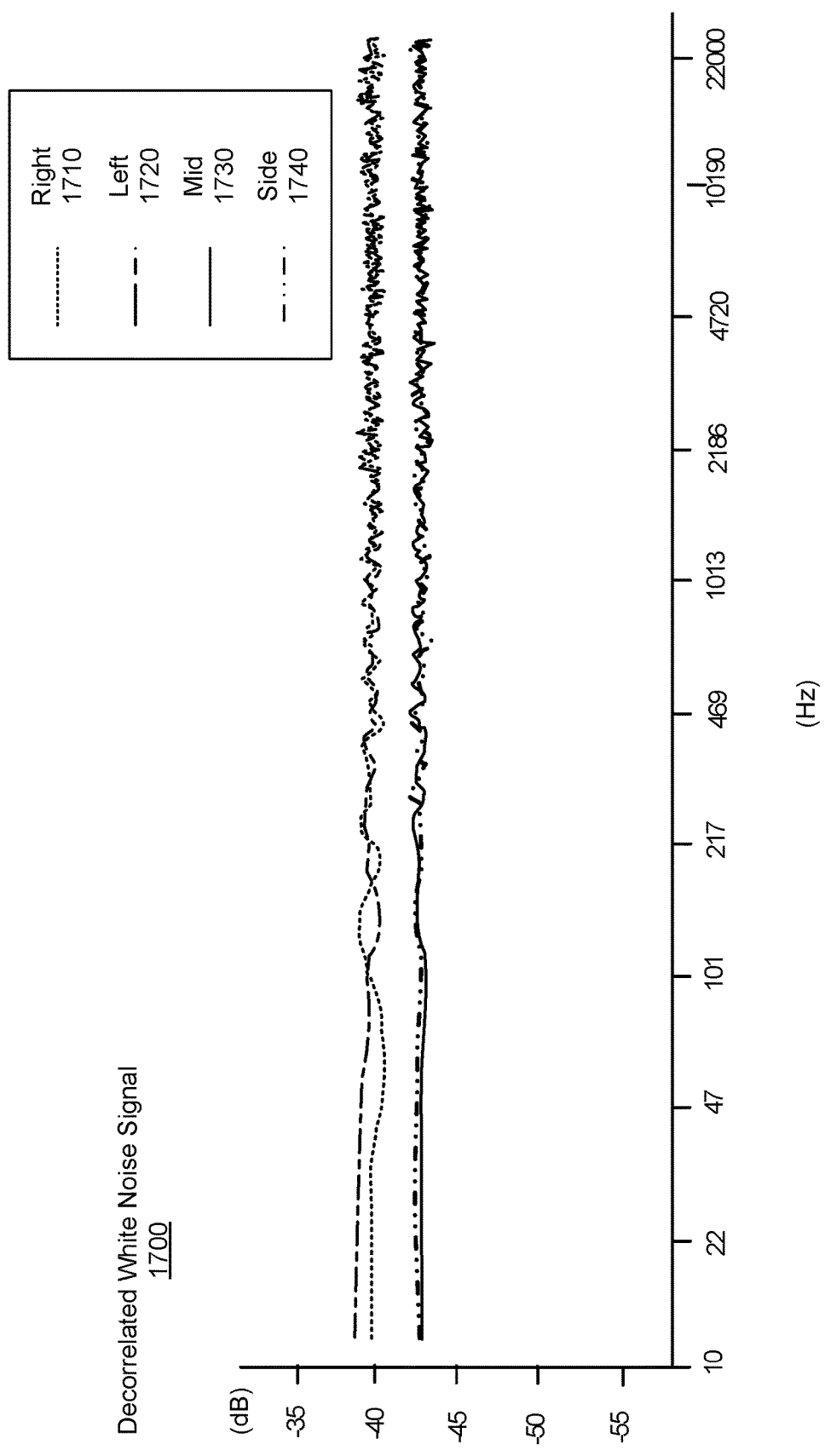

FIG. 17 illustrates decorrelated white noise signal 1700. The input white noise signal 1700 may be a two channel quadrature white noise signal including a right channel component 1710, a left channel component 1720. The plot also shows a mid component 1730 and a side component 1740 generated from the white noise signal. The spectral energy of the left channel component 1720 matches that of the right channel component 1710, and the spectral energy of the mid component 1730 matches that of the side component 1740. The mid component 1730 and side component 1740 are about 3 dB lower in signal level than the right channel component 1710 and the left channel component 1720.

Figure 18:
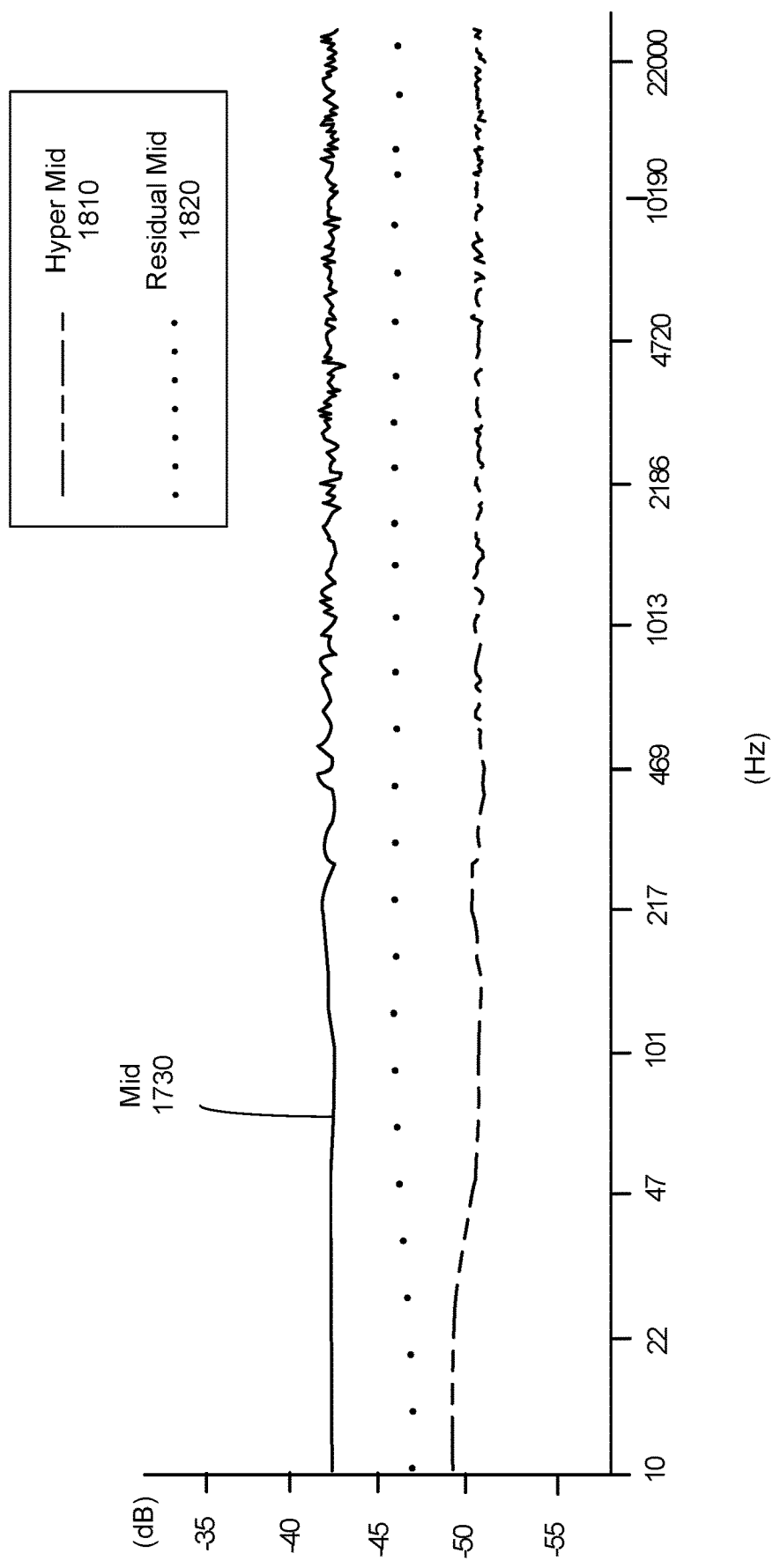

FIG. 18 illustrates the mid component 1730 decomposed into a hyper mid component 1810 and a residual mid component 1820. The mid component 1730 represents non-spatial information of the input audio signal in the soundstage. The hyper mid component 1810 includes a subcomponent of the non-spatial information found directly at the center of the soundstage; the residual mid component 1820 is the remaining non-spatial information. In typical stereo audio signals, the hyper mid component 1810 may include key features of the audio signal, such as dialog or vocals. In FIG. 18, the residual mid component 1820 is approximately 3 dB lower than the mid component 1730, and the hyper mid component 1810 is approximately 8-9 dB lower than the mid component 1730.

Figure 19:
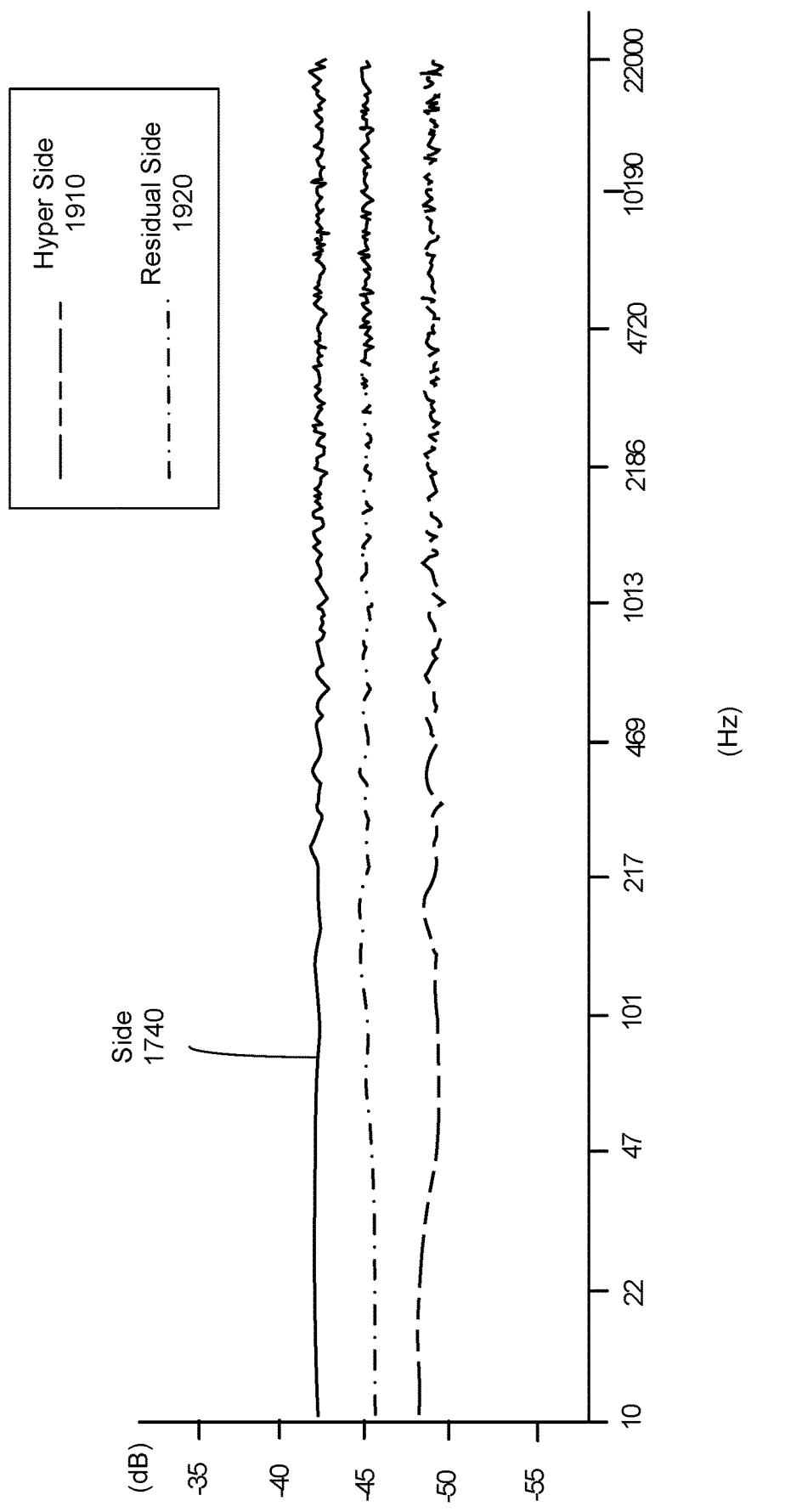

FIG. 19 illustrates the side component 1740 decomposed into a hyper side component 1910 and a residual side component 1920. The side component 1740 represents spatial information in the input audio signal in the sound stage. The hyper side component 1910 includes a subcomponent of the spatial information found at edges of the sound stage; the residual side component 1920 is the remaining spatial information. In typical stereo audio signals, the residual side component 1920 includes key features resulting from processing, such as the effects of binaural processing, panning techniques, reverberation, and/or decorrelation processes. As shown in FIG. 19, the relationship between the side component 1740, the hyper side component 1910, and the residual side component 1920 are similar to that of the mid component 1730, the hyper mid component 1810, and the residual side component 1820.

Computing Machine Architecture

Figure 20:
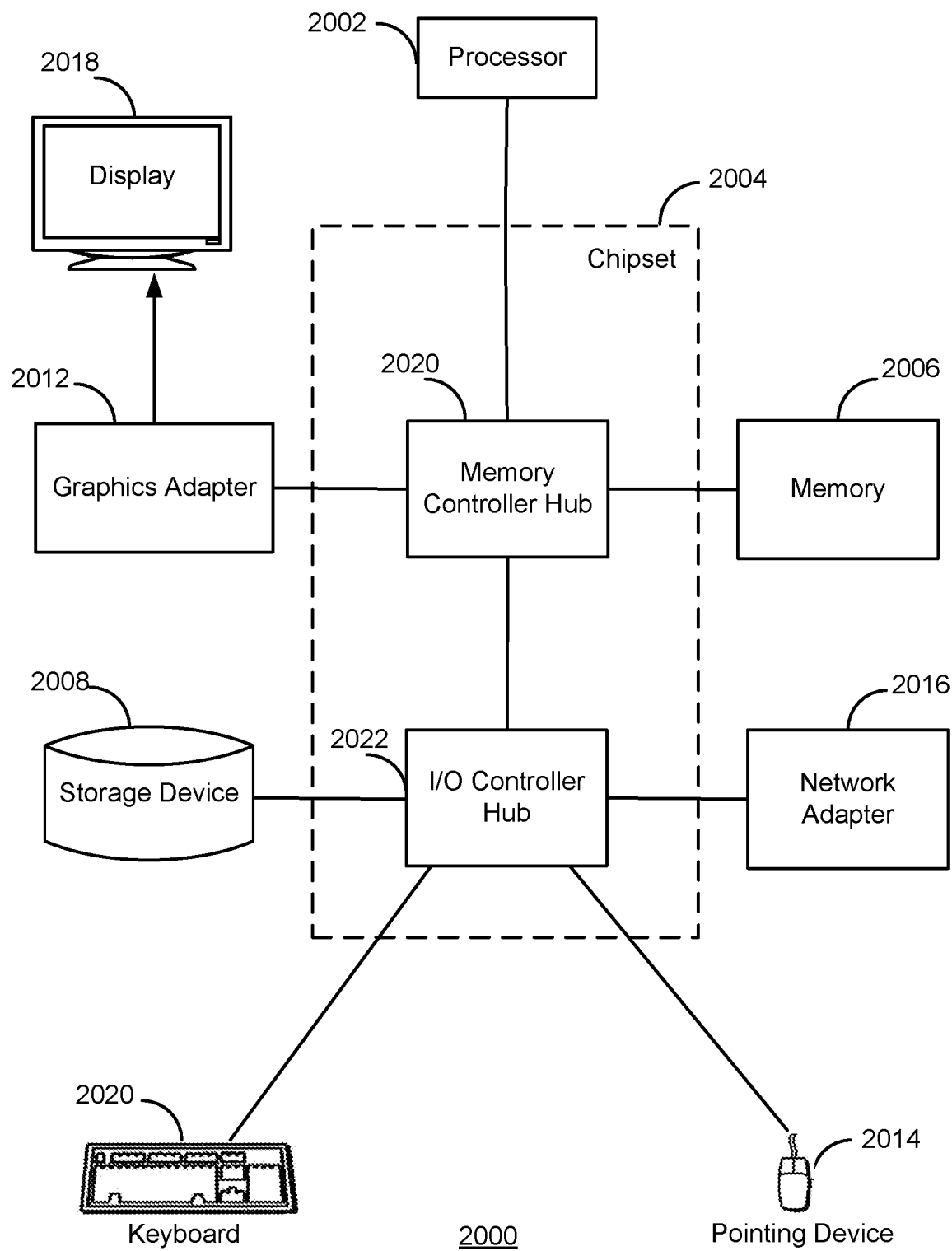
FIG. 20 is a block diagram of a computer system, in accordance with one or more embodiments.

FIG. 20 is a block diagram of a computer system 2000, in accordance with one or more embodiments. The computer system 2000 is an example of circuitry that implements an audio processing system. Illustrated are at least one processor 2002 coupled to a chipset 2004. The chipset 2004 includes a memory controller hub 2020 and an input/output (I/O) controller hub 2022. A memory 2006 and a graphics adapter 2012 are coupled to the memory controller hub 2020, and a display device 2018 is coupled to the graphics adapter 2012. A storage device 2008, keyboard 2010, pointing device 2014, and network adapter 2016 are coupled to the I/O controller hub 2022. The computer system 2000 may include various types of input or output devices. Other embodiments of the computer system 2000 have different architectures. For example, the memory 2006 is directly coupled to the processor 2002 in some embodiments.

The storage device 2008 includes one or more non-transitory computer-readable storage media such as a hard drive, compact disk read-only memory (CD-ROM), DVD, or a solid-state memory device. The memory 2006 holds program code (comprised of one or more instructions) and data used by the processor 2002. The program code may correspond to the processing aspects described with FIGS. 1-19.

The pointing device 2014 is used in combination with the keyboard 2010 to input data into the computer system 2000. The graphics adapter 2012 displays images and other information on the display device 2018. In some embodiments, the display device 2018 includes a touch screen capability for receiving user input and selections. The network adapter 2016 couples the computer system 2000 to a network. Some embodiments of the computer system 2000 have different and/or other components than those shown in FIG. 20.

Circuitry may include one or more processors that execute program code stored in a non-transitory computer readable medium, the program code when executed by the one or more processors configures the one or more processors to implement an audio processing system or modules of the audio processing system. Other examples of circuitry that implements an audio processing system or modules of the audio processing system may include an integrated circuit, such as an application-specific integrated circuit (ASIC), field-programmable gate array (FPGA), or other types of computer circuits.

ADDITIONAL CONSIDERATIONS

Example benefits and advantages of the disclosed configurations include dynamic audio enhancement due to the enhanced audio system adapting to a device and associated audio rendering system as well as other relevant information made available by the device OS, such as use-case information (e.g., indicating that the audio signal is used for music playback rather than for gaming). The enhanced audio system may either be integrated into a device (e.g., using a software development kit) or stored on a remote server to be accessible on-demand. In this way, a device need not devote storage or processing resources to maintenance of an audio enhancement system that is specific to its audio rendering system or audio rendering configuration. In some embodiments, the enhanced audio system enables varying levels of querying for rendering system information such that effective audio enhancement can be applied across varying levels of available device-specific rendering information.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuitry, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Upon reading this disclosure, those of skill in the art will appreciate still additional alternative structural and functional designs for a system and a process for audio enhancement using device-specific metadata through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A system, comprising:
a circuitry configured to:
generate a mid component and a side component from a left channel and a right channel of an audio signal;
generate a hyper mid component including spectral energy of the side component removed from spectral energy of the mid component;
generate a residual mid component including spectral energy of the hyper mid component removed from the spectral energy of the mid component;
filter subbands of the residual mid component; and
generate a left output channel and a right output channel using the filtered subbands of the residual mid component.

2. The system of claim 1, wherein each of the subbands of the residual mid component includes a set of critical bands.

3. The system of claim 1, wherein the circuitry is further configured to:
generate a hyper side component including the spectral energy of the mid component removed from the spectral energy of the side component;
generate a residual side component including the spectral energy of the hyper side component removed from the spectral energy of the side component;
filter subbands of the residual side component; and
generate the left and right output channels using the filtered subbands of the residual side component.

4. The system of claim 1, wherein the circuitry is further configured to
generate a hyper side component including the spectral energy of the mid component removed from the spectral energy of the side component;
filter subbands of the hyper side component; and
generate the left and right output channels using the filtered subbands of the hyper side component.

5. The system of claim 1, wherein the circuitry is further configured to:
filter subbands of the side component; and
generate the left and right output channels using the filtered subbands of the side component.

6. The system of claim 1, wherein the circuitry is further configured to:
filter subbands of the hyper mid component; and
generate the left and right output channels using the filtered subbands of the hyper mid component.

7. The system of claim 1, wherein the circuitry is further configured to apply crosstalk processing to the audio signal, the crosstalk processing including one of a crosstalk cancellation or a crosstalk simulation.

8. The system of claim 7, wherein the circuitry is further configured to filter the hyper mid component to compensate for spectral defects caused by the crosstalk processing.

9. The system of claim 7, wherein the circuitry is further configured to filter the residual mid component to compensate for spectral defects caused by the crosstalk processing.

10. The system of claim 7, wherein the circuitry is further configured to filter the mid component to compensate for spectral defects caused by the crosstalk processing.

11. The system of claim 7, wherein the circuitry is further configured to:
generate a hyper side component including the spectral energy of the mid component removed from the spectral energy of the side component; and
filter the hyper side component to compensate for spectral defects caused by the crosstalk processing.

12. The system of claim 7, wherein the circuitry is further configured to:
generate a residual side component including the spectral energy of the hyper side component removed from the spectral energy of the side component; and
filter the residual side component to compensate for spectral defects caused by the crosstalk processing.

13. The system of claim 7, wherein the circuitry is further configured to filter the side component to compensate for spectral defects caused by the crosstalk processing.

14. A non-transitory computer readable medium comprising stored program code, the program code when executed by at least one processor configures the at least one processor to:
generate a mid component and a side component from a left channel and a right channel of an audio signal;
generate a hyper mid component including spectral energy of the side component removed from spectral energy of the mid component;
generate a residual mid component including spectral energy of the hyper mid component removed from the spectral energy of the mid component;
filter subbands of the residual mid component; and
generate a left output channel and a right output channel using the filtered subbands of residual mid component.

15. The non-transitory computer readable medium of claim 14, wherein each of the subbands of the residual mid component includes a set of critical bands.

16. The non-transitory computer readable medium of claim 14, wherein the program code further configures the at least one processor to:
generate a hyper side component including the spectral energy of the mid component removed from the spectral energy of the side component;
generate a residual side component including the spectral energy of the hyper side component removed from the spectral energy of the side component;
filter subbands of the residual side component; and
generate the left and right output channels using the filtered subbands of the residual side component.

17. The non-transitory computer readable medium of claim 14, wherein the program code further configures the at least one processor to:
generate a hyper side component including the spectral energy of the mid component removed from the spectral energy of the side component;
filter subbands of the hyper side component; and
generate the left and right output channels using the filtered subbands of the hyper side component.

18. The non-transitory computer readable medium of claim 14, wherein the program code further configures the at least one processor to:
filter subbands of the side component; and
generate the left and right output channels using the filtered subbands of the side component.

19. The non-transitory computer readable medium of claim 14, wherein the program code further configures the at least one processor to:
filter subbands of the hyper mid component; and
generate the left and right output channels using the filtered subbands of the hyper mid component.

20. The non-transitory computer readable medium of claim 14, wherein the program code further configures the at least one processor to apply crosstalk processing to the audio signal, the crosstalk processing including one of a crosstalk cancellation or a crosstalk simulation.

21. The non-transitory computer readable medium of claim 20, wherein the program code further configures the at least one processor to filter the hyper mid component to compensate for spectral defects caused by the crosstalk processing.

22. The non-transitory computer readable medium of claim 20, wherein the program code further configures the at least one processor to filter the residual mid component to compensate for spectral defects caused by the crosstalk processing.

23. The non-transitory computer readable medium of claim 20, wherein the program code further configures the at least one processor to filter the mid component to compensate for spectral defects caused by the crosstalk processing.

24. The non-transitory computer readable medium of claim 20, wherein the program code further configures the at least one processor to:
generate a hyper side component including the spectral energy of the mid component removed from the spectral energy of the side component; and
filter the hyper side component to compensate for spectral defects caused by the crosstalk processing.

25. The non-transitory computer readable medium of claim 20, wherein the program code further configures the at least one processor to:
generate a residual side component including the spectral energy of the hyper side component removed from the spectral energy of the side component; and
filter the residual side component to compensate for spectral defects caused by the crosstalk processing.

26. The non-transitory computer readable medium of claim 20, wherein the program code further configures the at least one processor to filter the side component to compensate for spectral defects caused by the crosstalk processing.

27. A method, comprising, by a circuitry:
generating a mid component and a side component from a left channel and a right channel of an audio signal;
generating a hyper mid component including spectral energy of the side component removed from spectral energy of the mid component;
generating a residual mid component including spectral energy of the hyper mid component removed from the spectral energy of the mid component;
filtering subbands of the residual mid component; and
generating a left output channel and a right output channel using the filtered subbands of residual mid component.

28. The method of claim 27, wherein each of the subbands of the residual mid component includes a set of critical bands.

29. The method of claim 27, further comprising, by the circuitry:
generating a hyper side component including the spectral energy of the mid component removed from the spectral energy of the side component;
generating a residual side component including the spectral energy of the hyper side component removed from the spectral energy of the side component; and
filtering subbands of the residual side component; and
generating the left and right output channels using the filtered subbands of the residual side component.

30. The method of claim 27, further comprising, by the circuitry:
generating a hyper side component including the spectral energy of the mid component removed from the spectral energy of the side component;
filtering subbands of the hyper side component; and
generating the left and right output channels using the filtered subbands of the hyper side component.

31. The method of claim 27, further comprising, by the circuitry:
filtering subbands of the side component; and
generating the left and right output channels using the filtered subbands of the side component.

32. The method of claim 27, further comprising, by the circuitry:
filtering subbands of the hyper mid component; and
generating the left and right output channels using the filtered subbands of the hyper mid component.

33. The method of claim 27, further comprising, by the circuitry, applying crosstalk processing to the audio signal, the crosstalk processing including one of a crosstalk cancellation or a crosstalk simulation.

34. The method of claim 33, further comprising, by the circuitry, filtering the hyper mid component to compensate for spectral defects caused by the crosstalk processing.

35. The method of claim 33, further comprising, by the circuitry, filtering the residual mid component to compensate for spectral defects caused by the crosstalk processing.

36. The method of claim 33, further comprising, by the circuitry, filtering the mid component to compensate for spectral defects caused by the crosstalk processing.

37. The method of claim 33, further comprising, by the circuitry:
generating a hyper side component including the spectral energy of the mid component removed from the spectral energy of the side component; and
filtering the hyper side component to compensate for spectral defects caused by the crosstalk processing.

38. The method of claim 33, further comprising, by the circuitry:
generating a residual side component including the spectral energy of the hyper side component removed from the spectral energy of the side component; and
filtering the residual side component to compensate for spectral defects caused by the crosstalk processing.

39. The method of claim 33, further comprising, by the circuitry, filtering the side component to compensate for spectral defects caused by the crosstalk processing.

* * * * *

UNITED STATES PATENT AND TRADEMARK OFFICE
CERTIFICATE OF CORRECTION

PATENT NO. : 11,032,644 B2
APPLICATION NO. : 16/983827
DATED : June 8, 2021
INVENTOR(S) : Zachary Seldess Page 1 of 1

It is certified that error appears in the above-identified patent and that said Letters Patent is hereby corrected as shown below:

In the Claims

In Column 29, in Claim 4, Line 36, after "to" insert -- : --.

In Column 30, in Claim 14, Line 31, after "subbands of" insert -- the --.

In Column 31, in Claim 27, Line 52, after "subbands of" insert -- the --.

Signed and Sealed this
Twenty-first Day of September, 2021

Drew Hirshfeld
*Performing the Functions and Duties of the*
*Under Secretary of Commerce for Intellectual Property and*
*Director of the United States Patent and Trademark Office*